United States Patent
Watanabe

(10) Patent No.: US 7,430,079 B2
(45) Date of Patent: Sep. 30, 2008

(54) ZOOM LENS AND IMAGING SYSTEM USING THE SAME

(75) Inventor: Masahito Watanabe, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/975,101

(22) Filed: Oct. 16, 2007

(65) Prior Publication Data

US 2008/0088944 A1   Apr. 17, 2008

(30) Foreign Application Priority Data

Oct. 17, 2006  (JP)  ............................. 2006-282221
Oct. 17, 2006  (JP)  ............................. 2006-282222

(51) Int. Cl.
*G02B 15/14* (2006.01)

(52) U.S. Cl. ...................... 359/687; 359/684

(58) Field of Classification Search ................. 359/687, 359/684
See application file for complete search history.

(56) References Cited

U.S. PATENT DOCUMENTS 7,173,769 B2 *  2/2007  Park ........................... 359/687
7,190,529 B2 *  3/2007  Miyajima et al. ........... 359/687
7,286,304 B1 * 10/2007  Ohtake ........................ 359/774
7,382,549 B2 *  6/2008  Miyajima .................... 359/686

FOREIGN PATENT DOCUMENTS

| JP | 2004-12639 | 1/2004 |
| JP | 2005-242014 | 9/2005 |
| JP | 2006-133631 | 5/2006 |

* cited by examiner

*Primary Examiner*—Scott J Sugarman
(74) *Attorney, Agent, or Firm*—Kenyon & Kenyon LLP

(57) ABSTRACT

The invention relates to a high-performance, high-zoom-ratio zoom lens that can be much more reduced in terms of thickness upon received at a collapsible lens mount, and an imaging system incorporating the same. The zoom lens comprises a positive first lens group G1, a negative second lens group G2, a positive third lens group G3 and a positive fourth lens group G4. Upon zooming from the wide-angle end to the telephoto end, the first G1, the second G2, the third G3 and the fourth lens group G4 each move such that the air spacing between the first G1 and the second lens group G2 grows wide, the air spacing between the second G2 and the third lens group G3 becomes narrow, and the air spacing between the third G3 and the fourth lens group G4 grows wide. The zoom lens satisfies condition (1) with respect to the transverse magnification of the second lens group G2 at the wide-angle end, and condition (2) with respect to the focal distance ratio of the zoom lens system between the wide-angle end and the telephoto end.

21 Claims, 12 Drawing Sheets

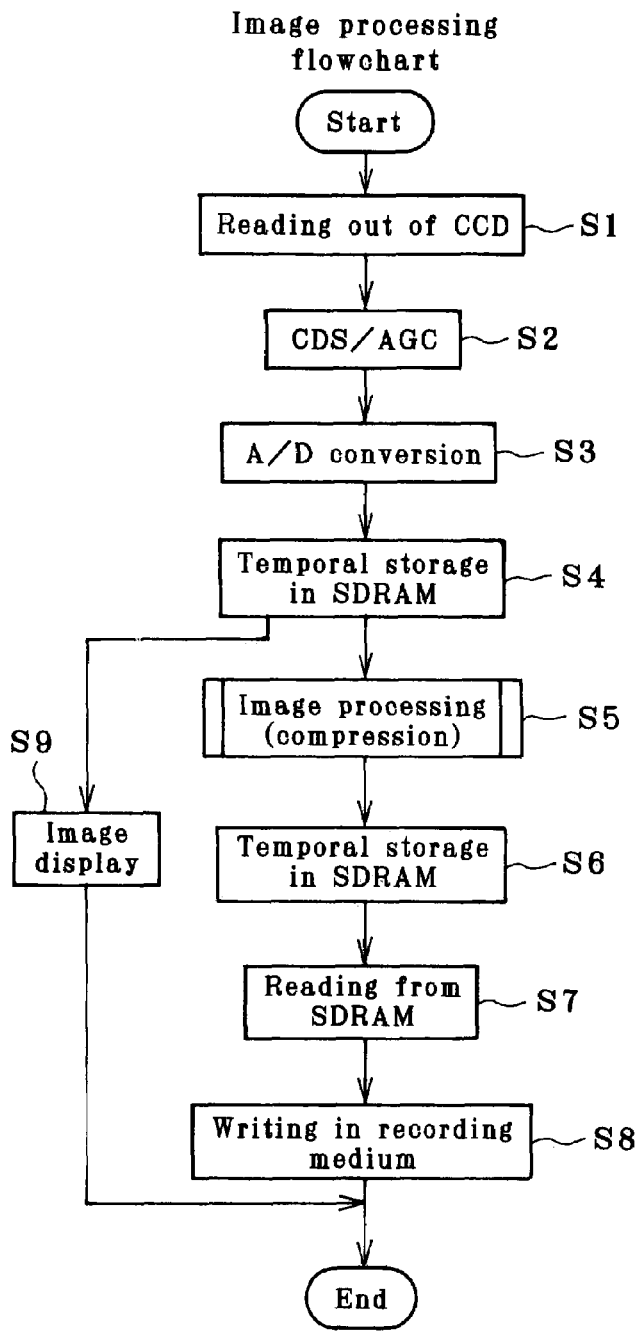
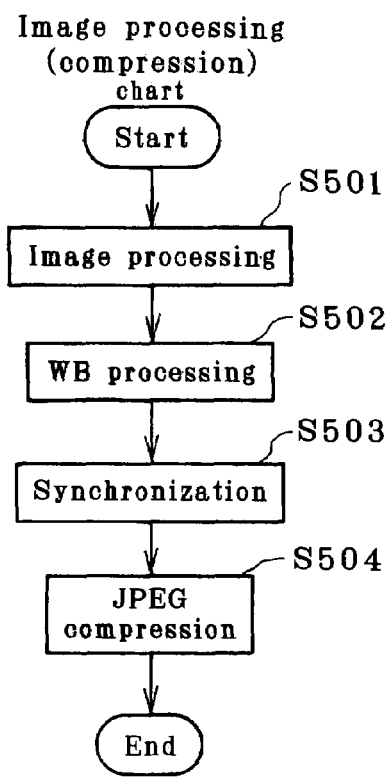
FIG. 12(a) Image processing flowchart
FIG. 12(b) Image processing (compression) chart

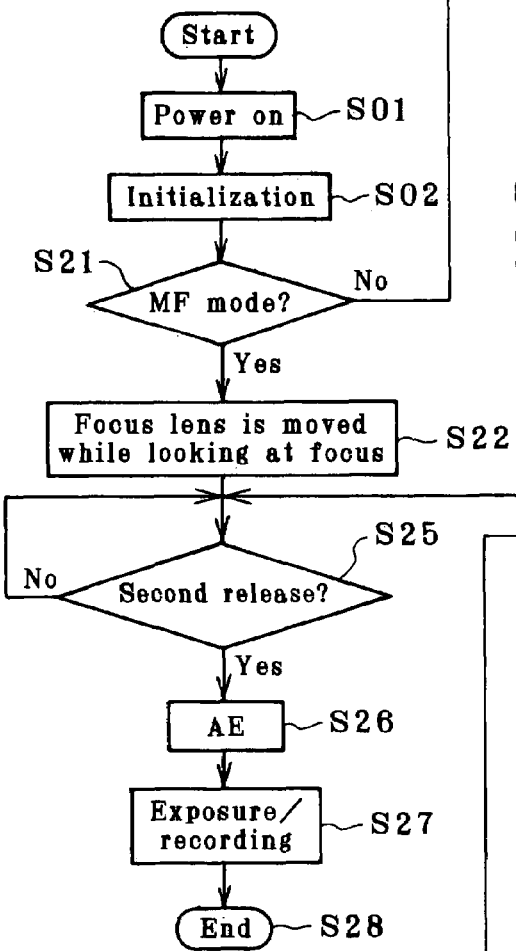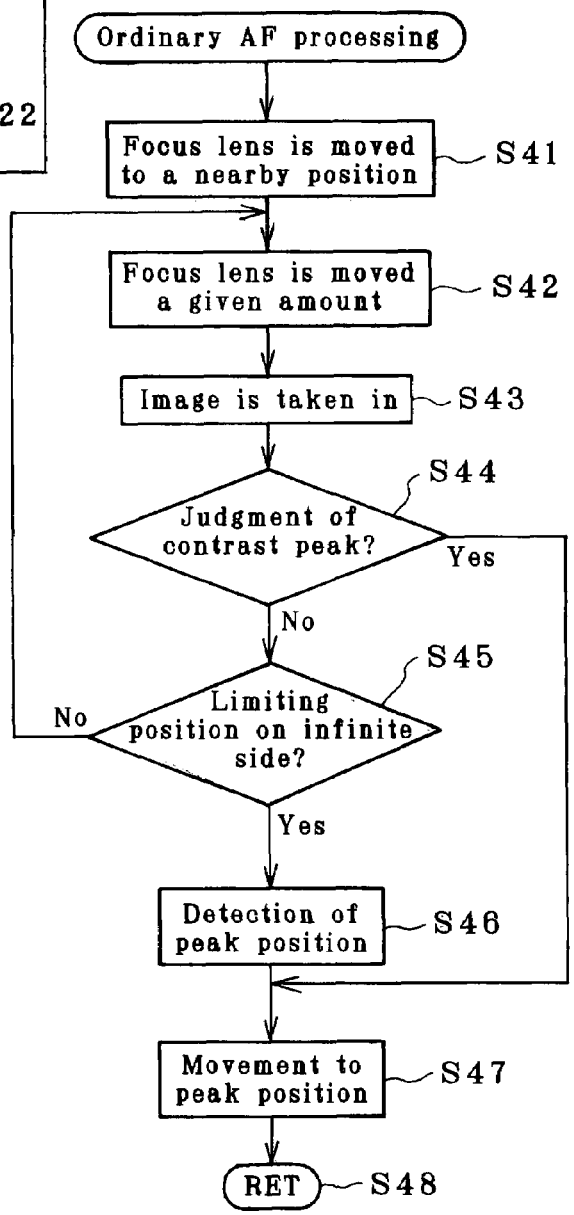

ZOOM LENS AND IMAGING SYSTEM USING THE SAME

This application claims benefits of Japanese Application Nos. 2006-282221 and 2006-282222 filed in Japan on Oct. 17, 2006, the contents of which are incorporated herein by this reference.

BACKGROUND OF THE INVENTION

The present invention relates generally to a zoom lens and an imaging system incorporating the same, and more particularly to a high-zoom-ratio zoom lens well adaptable to electronic imaging devices such as CCDs or C-MOSs and an imaging system incorporating the same.

For zoom lens systems having high zoom ratios, comprising fewer lenses and having a short overall length, for instance, Patent Publication 1 has come up with a zoom lens comprising, in order from its object side, a positive first lens group, a negative second lens group, a positive third lens group and a fourth lens group, wherein all the lens groups move for zooming.

Zoom lenses having a zoom ratio of the order of 10 are disclosed in Patent Publications 2 and 3.

The zoom lens of Patent Publication 1 or the like has a zoom ratio of about 5; if the zoom ratio is brought up to about 10, its image-formation capability will become worse. A zoom lens having a zoom ratio of about 10 and primarily adapted to video cameras is set forth in Patent Publication 2 or the like.

Patent Publication 3 or the like has come up with a zoom lens that has a zoom ratio of about 10 and is designed to be received at a collapsible lens mount during storage, thereby achieving size reductions.

Patent Publication 1
JP(A)2004-12639
Patent Publication 2
JP(A)2005-242014
Patent Publication 3
JP(A)2006-133631

The zoom lens of Patent Publication 1 has a zoom ratio of about 5; if the zoom ratio is brought up to about 10, its image-formation capability will become worse, and its full length will grow long as well.

The zoom lens of Patent Publication 2 is of the type that is primarily used with video cameras or the like, and so it is unfit for slimming down a camera upon received at a lens mount, because of being based on the camera layout with the first lens group fixed relative to an imaging device.

The zoom lens of Patent Publication 3 has a zoom ratio of about 10, and is designed to be received at a lens mount upon storage, thereby achieving size reductions. However, its full length is long. Further, when multiple lens barrels received at the lens mount are extended out of it, it is still impossible to make the zoom lens received at the lens mount sufficiently thin, because of the requirement that the respective lens groups must be moved for zooming in the length of the extended lens barrels.

SUMMARY OF THE INVENTION

In consideration of such situations of the prior art as briefed above, the primary object of the invention is to provide a high-performance, high-zoom-ratio zoom lens that can be slimmed down upon received at a collapsible lens mount, and an imaging system incorporating the same.

More specifically, the present invention makes it possible to achieve a zoom lens which can have a zoom ratio on the order of 10 and whose thickness upon received at a collapsible lens mount is on the same level as that of a conventional zoom lens having a zoom ratio of about 5 or lower.

The first zoom lens with which the aforesaid object is achievable comprises, in order from its object, a first lens group of positive refracting power, a second lens group of negative refracting power, a third lens group of positive refracting power and a fourth lens group of positive refracting power, and is characterized in that upon zooming from the wide-angle end to the telephoto end of the zoom lens, said first lens group, said second lens group, said third lens group and said fourth lens group each move such that the air spacing between said first lens group and said second lens group grows wide, the air spacing between said second lens group and said third lens group becomes narrow, and the air spacing between said third lens group and said fourth lens group grows wide, and said zoom lens satisfies the following conditions (1) and (2).

$$-0.7 < Mg_{w2} < -0.35 \tag{1}$$

$$9 < f_t/f_w < 20 \tag{2}$$

Here $Mg_{w2}$ is the transverse magnification of the second lens group at the wide-angle end,
$f_w$ is the focal length of the zoom lens system at the wide-angle end, and
$f_t$ is the focal length of the zoom lens system at the telephoto end.

The second zoom lens of the invention comprises, in order from its object, a first lens group of positive refracting power, a second lens group of negative refracting power, a third lens group of positive refracting power and a fourth lens group of positive refracting power, and is characterized in that upon zooming from the wide-angle end to the telephoto end of the zoom lens, said first lens group, said second lens group, said third lens group and said fourth lens group each move such that the air spacing between said first lens group and said second lens group grows wide, the air spacing between said second lens group and said third lens group becomes narrow, and the air spacing between said third lens group and said fourth lens group grows wide, and said zoom lens satisfies the following conditions (3), (4) and (2).

$$2.5 < X_3/f_w < 5 \tag{3}$$

$$-2 < X_4/f_w < 0 \tag{4}$$

$$9 < f_t/f_w < 20 \tag{2}$$

Here $f_w$ is the focal length of the zoom lens system at the wide-angle end,
$f_t$ is the focal length of the zoom lens system at the telephoto end,
$X_3$ is the amount of movement of the third lens group from the wide-angle end to the telephoto end (the movement of the third lens group toward the object side is taken as positive), and
$X_4$ is the amount of movement of the fourth lens group from the wide-angle end to the telephoto end (the movement of the fourth lens group toward the object side is taken as positive).

The third zoom lens of the invention comprises, in order from its object, a first lens group of positive refracting power, a second lens group of negative refracting power, a third lens group of positive refracting power and a fourth lens group of positive refracting power, and is characterized in that upon zooming from the wide-angle end to the telephoto end of the zoom lens, said first lens group, said second lens group, said third lens group and said fourth lens group each move such that the air spacing between said first lens group and said second lens group grows wide, the air spacing between said second lens group and said third lens group becomes narrow, and the air spacing between said third lens group and said fourth lens group grows wide, and said zoom lens satisfies the following conditions (5), (3) and (2).

$$0 < X_1/f_w < 2 \quad (5)$$

$$2.5 < X_3/f_w < 5 \quad (3)$$

$$9 < f_t/f_w < 20 \quad (2)$$

Here $f_w$ is the focal length of the zoom lens system at the wide-angle end, $X_1$ is the amount of movement of the first lens group from the wide-angle end to the telephoto end (the movement of the first lens group toward the object side is taken as positive), and $X_3$ is the amount of movement of the third lens group from the wide-angle end to the telephoto end (the movement of the third lens group toward the object side is taken as positive).

The fourth zoom lens of the invention comprises, in order from its object, a first lens group of positive refracting power, a second lens group of negative refracting power, a third lens group of positive refracting power and a fourth lens group of positive refracting power, and is characterized in that upon zooming from the wide-angle end to the telephoto end of the zoom lens, said first lens group, said second lens group, said third lens group and said fourth lens group independently move such that the air spacing between said first lens group and said second lens group grows wide, the air spacing between said second lens group and said third lens group becomes narrow, and the air spacing between said third lens group and said fourth lens group grows wide, and said zoom lens satisfies the following conditions (11) and (21).

$$3 < D_{1p}/D_{1n} < 5 \quad (11)$$

$$9 < f_t/f_w < 20 \quad (21)$$

Here $D_{1p}$ is the thickness on an optical axis of a positive lens in the first lens group, $D_{1n}$ is the thickness on an optical axis of a negative lens in the first lens group, $f_w$ is the focal length of the zoom lens system at the wide-angle end, and $f_t$ is the focal length of the zoom lens system at the telephoto end.

The advantages of, and the requirements for, the aforesaid arrangements in the invention are now explained.

As in the aforesaid 1$^{st}$ to 3$^{rd}$ zoom lenses, if a zoom lens comprising, in order from its object side, a first lens group of positive refracting power, a second lens group of negative refracting power, a third lens group of positive refracting power and a fourth lens group of positive refracting power is designed such that upon zooming from the wide-angle end to the telephoto end, said first lens group, said second lens group, said third lens group and said fourth lens group each move with a widening air spacing between said first lens group and said second lens group, a narrowing air spacing between said second lens group and said third lens group and a widening air spacing between said third lens group and said fourth lens group, then that zoom lens can be much more slimmed down upon received at a collapsible lens mount, and have a high zoom ratio with improved image-formation capability all over the zooming range.

Condition (1) is about the amount of movement of the respective moving lens groups. As the lower limit of −0.7 to that is not reached, it will cause the amount of movement of the third lens group to grow too large during zooming, and so the second and third lens barrels will grow long, giving rise to an increase in the thickness of the zoom lens comprising lens groups upon received at a collapsible lens mount. As the upper limit of −0.35 is exceeded, it will cause the amount of relative movement of the first and second lens groups to grow too large during zooming, and so the first lens barrel will grow long, giving rise to an increase in the thickness of the zoom lens upon received at a collapsible lens mount. Satisfaction of the condition: $-0.6 < Mg_{w2} < -0.4$ allows the full length of the zoom lens to become short, and works for an increase in the degree of flexibility in designing the associated lens barrel.

Condition (2) is about the zoom ratio of the zoom lens. As the upper limit of 20 to that is exceeded, it will cause the amount of movement of the respective lens groups to grow too large during zooming, rendering size reductions difficult. As the lower limit of 9 is not reached, it will cause the zoom ratio to become low, detracting much from zoom lens specifications. Condition (2) may also be applied to other arrangement to reduce its size.

Condition (3) is about the amount of movement of the third lens group. As the upper limit of 5 to that is exceeded, it will cause the amount of movement of the third lens group to grow too large during zooming, and so the second and third lens barrels will grow long, giving rise to an increase in the thickness of the zoom lens comprising lens groups upon received at a collapsible lens mount. As the lower limit of 2.5 is not reached, it will cause the amount of relative movement of the first and second lens groups to grow too large during zooming, and so the first lens barrel will grow long, giving rise to an increase in the thickness of the zoom lens upon received at a collapsible lens mount.

Condition (4) is about the amount of movement of the fourth lens group. As the upper limit of 0 that is exceeded, it will cause the magnification of the fourth lens group to become low at the time of zooming from the wide-angle end to the telephoto end. This in turn will give rise to an increased loading of the third lens group on zooming, and render it difficult to correct aberrations with fewer lenses. As the lower limit of −2 is not reached, it will cause the fourth lens group to be too farther forward at the wide-angle end or too farther backward the telephoto end, so that when focusing is implemented at the fourth lens group, the fourth lens group will be likely to interfere with the subsequent member at the telephoto end due to production errors, if any.

Condition (5) is about the amount of movement of the first lens group. As the upper limit of 2 to that is exceeded, it will cause the amount of relative movement of the first and second lens groups to grow too large at the time of zooming from the wide-angle end to the telephoto end, and so the first lens barrel will grow long, giving rise to an increase in the thickness of the zoom lens upon received at the collapsible lens mount. As the lower limit of 0 is not reached, it will cause the amount of movement of the second lens group in the associated lens barrel to grow too large, giving rise to an increase in the zoom lens upon received at the collapsible lens mount.

Moreover, it is desirable for the zoom lens of the invention to satisfy the following condition (6).

$$-20 < Dt_w < -10 \quad (6)$$

Here $Dt_w$ is distortion (%) of the maximum image height at the wide-angle end.

Condition (6) is about distortion at the wide-angle end. As the upper limit of −10 to that is exceeded, it will cause field curvature and chromatic aberration of magnification to be likely to grow noticeable at the wide-angle end, rendering it difficult to design the first lens group with fewer lenses and so resulting in a failure in size reductions. As the lower limit of −20 is not reached, it will cause distortion to grow too large on the image plane, rendering it difficult to correct that distortion by means of image processing.

It is also preferable that there is an aperture stop interposed between said second lens group and said third lens group, and that aperture stop is movable together with said third lens group during zooming.

It is then preferable that said third lens group includes only one positive lens, and that positive lens satisfies the following condition (7).

$$75 < Vd_3 < 100 \tag{7}$$

Here $Vd_3$ is the Abbe number of the positive lens in the third lens group.

Condition (7) is about the Abbe number of the positive lens in the third lens group. Any departure from the upper limit of 100 or the lower limit of 75 will cause longitudinal chromatic aberrations to remain under-corrected, giving rise to a drop of resolution.

Further, it is preferred that said first lens group comprises only one negative lens, and that negative lens satisfies the following conditions (8) and (9).

$$17 < Vd_1 < 30 \tag{8}$$

$$1.9 < nd_1 < 2.3 \tag{9}$$

Here $Vd_1$ is the Abbe number of the negative lens in the first lens group, and $nd_1$ is the d-line refractive index of the negative lens in the first lens group.

Conditions (8) and (9) are about the Abbe number and refractive index of the negative lens in the first lens group, respectively. If a material enough to satisfy conditions (8) and (9) is used for the first lens group, it is then possible to make well-balanced correction of chromatic aberration of magnification, longitudinal chromatic aberration and field curvature.

Furthermore, it is preferable that the negative lens in said third lens group satisfies the following condition (10).

$$-8 < (R_{3nb} + R_{3nf})/(R_{3nb} - R_{3nf}) < -4 \tag{10}$$

Here $R_{3nf}$ is the radius of curvature near the optical axis of the object-side surface of the negative lens in the third lens group, and $R_{3nb}$ is the radius of curvature near the optical axis of the image-side surface of the negative lens in the third lens group.

Condition (10) is about the shaping factor of the negative lens in the third lens group. As the lower limit of −8 to that is not reached, it will render correction of spherical aberrations and coma difficult. As the upper limit of −4 is exceeded, it will render it impossible to bring the principal points of the third lens group close to the second lens group, resulting in difficulty in allowing the zoom lens to have high zoom ratios.

It is also preferable that said first lens group comprises, in order from its object side, a negative lens and a positive lens.

Thus, if the first lens group is composed of a negative lens and a positive lens, it is then easy to correct field curvature and chromatic aberration of magnification with fewer lenses.

As in the aforesaid fourth zoom lens, if a zoom lens comprising, in order from its object side, a first lens group of positive refracting power, a second lens group of negative refracting power, a third lens group of positive refracting power and a fourth lens group of positive refracting power is designed such that upon zooming from the wide-angle end to the telephoto end, said first lens group, said second lens group, said third lens group and said fourth lens group each move with a widening air spacing between said first lens group and said second lens group, a narrowing air spacing between said second lens group and said third lens group and a widening air spacing between said third lens group and said fourth lens group, and said first lens group is made up of two lenses while said third lens group is composed of two lenses: a positive lens and a negative lens in order from its object side, then that zoom lens can be much more slimmed down upon received at a collapsible lens mount, and have a high zoom ratio with improved image-formation capability all over the zooming range.

Condition (11) is about the thickness ratio between the positive lens and the negative lens in the first lens group. As the upper limit of 5 to that is exceeded, it will cause the first lens group to grow thick or have a shape rendering the fabrication of the negative lens difficult. As the lower limit of 3 is not reached, it will be difficult to make sure the quantity of rim light while holding back field curvature.

Condition (12) is about the zoom ratio of the zoom lens. As the upper limit of 20 to that is exceeded, it will cause the amount of movement of the respective lens groups to grow too large during zooming, rendering size reductions difficult. As the lower limit of 9 is not reached, it will cause the zoom ratio to become low, detracting much from zoom lens specifications. Condition (12) may also be applied to other arrangement to reduce its size.

Preferably, said first lens group comprises, in order from its object side, a negative lens and a positive lens.

Thus, if the first lens group is made up of a negative lens and a positive lens, it is then easy to correct field curvature and chromatic aberration of magnification with fewer lenses.

Preferably, the positive lens in said third lens group has an aspheric surface, and satisfies the following condition (13).

$$75 < Vd_3 < 100 \tag{13}$$

Here $Vd_3$ is the Abbe number of the positive lens in the third lens group.

Condition (13) is about the Abbe number of the positive lens in the third lens group. Any departure from the upper limit of 100 or the lower limit of 75 will cause longitudinal chromatic aberrations to remain under-corrected, giving rise to a drop of resolution.

Moreover, it is desirable for the zoom lens of the invention to satisfy the following condition (14).

$$-20 < Dt_w < -10 \tag{14}$$

Here $Dt_w$ is distortion (%) of the maximum image height at the wide-angle end.

Condition (14) is about distortion at the wide-angle end. As the upper limit of −10 to that is exceeded, it will cause field curvature and chromatic aberration of magnification to be likely to be noticeable at the wide-angle end, rendering it difficult to design the first lens group with fewer lenses and so resulting in a failure in size reductions. As the lower limit of −20 is not reached, it will cause distortion to grow too large on the image plane, rendering it difficult to correct that distortion by means of image processing.

It is also preferable that there is an aperture stop interposed between said second lens group and said third lens group, and that aperture stop is movable together with said third lens group during zooming.

Further, it is preferred that the negative lens in said first lens group satisfies the following conditions (15) and (16).

$$17<Vd_1<30 \quad (15)$$

$$1.9<nd_1<2.3 \quad (16)$$

Here $Vd_1$ is the Abbe number of the negative lens in the first lens group, and $nd_1$ is the d-line refractive index of the negative lens in the first lens group.

Conditions (15) and (16) are about the Abbe number and refractive index of the negative lens in the first lens group, respectively. If a material enough to satisfy conditions (15) and (16) is used for the first lens group, it is then possible to make well-balanced correction of chromatic aberration of magnification, longitudinal chromatic aberration and field curvature.

It is then desired that said first lens group consists solely of a cemented lens.

If the first lens group is made up of only a cemented lens, it is then possible to reduce the influences of production errors on image-formation capability in assembling lens parts to an associated frame.

Furthermore, it is preferable that the negative lens in said third lens group satisfies the following condition (17).

$$-8<(R_{3nb}+R_{3nf})/(R_{3nb}-R_{3nf})<-4 \quad (17)$$

Here $R_{3nf}$ is the radius of curvature near the optical axis of the object-side surface of the negative lens in the third lens group, and $R_{3nb}$ is the radius of curvature near the optical axis of the image-side surface of the negative lens in the third lens group.

Condition (17) is about the shaping factor of the negative lens in the third lens group. As the lower limit of −8 to that is not reached, it will render correction of spherical aberrations and coma difficult. As the upper limit of −4 is exceeded, it will render it impossible to bring the principal points of the third lens group close to the second lens group, resulting in difficulty in allowing the zoom lens to have high zoom ratios.

The present invention also encompasses an imaging system comprising any of the aforesaid zoom lenses and an imaging device that is located on an image side of the zoom lens and converts an optical image into electric signals.

Moreover, the present invention encompasses an image recording method, wherein an image formed through any one of the first to fourth zoom lenses is received at an imaging device; an image signal produced out of said imaging device is retained, then subjected to gain control and then subjected to A/D conversion; an image signal subjected to said A/D conversion is stored in a memory, after which an image signal read out of said memory is subjected to compression processing; and finally said image signal is recorded in a recording medium.

Further, the present invention encompasses an image display method, wherein an image formed through any one of the first to fourth zoom lenses is received at an imaging device; an image signal produced out of said imaging device is retained, then subjected to gain control and then subjected to A/D conversion; and an image signal subjected to said A/D conversion is stored in a memory, after which the image signal is read out of said memory to display an image on a display.

Furthermore, the present invention encompasses a method for taking an image by means of a taking system comprising an autofocus step of implementing autofocusing having an AF processing function implemented on the basis of the contrast of a subject image and a manual focus step of manually implementing focusing, wherein:

either one of said autofocus step and said manual focus step is selected, and whether or not a taking start order is issued is judged by a taking operation member, exposure conditions are determined after the taking start order is issued, and on the basis of said exposure conditions, a subject image formed through any one of the first to fourth zoom lenses is received at an imaging device.

According to the invention as described above, it is possible to achieve a zoom lens that can be much more slimmed down upon received at a (collapsible) lens mount, and has a high zoom ratio with improved image formation capability all over the zooming range, and an imaging system incorporating such a zoom lens.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIG. 12 is a flowchart illustrative of image storage and what is displayed and processed.

FIG. 13 is one example of the flowchart illustrative of the content of processing implemented when the focus lens at the focusing block is preset at a position focusing at infinity.

DESCRIPTION OF THE PREFERRED EMBODIMENTS

Figure 1A:
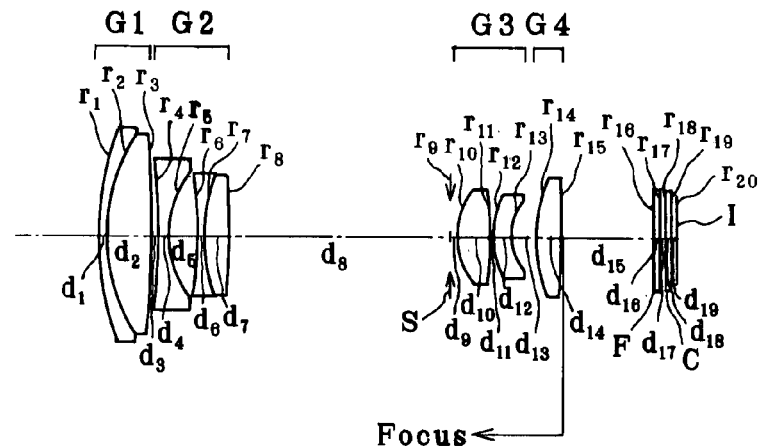
FIG. 1 is illustrative in lens arrangement section of Example 1 of the inventive zoom lens at the wide-angle end (a), in an intermediate state (b) and at the telephoto end (c) upon focusing on an object point at infinity.
Figure 1B:
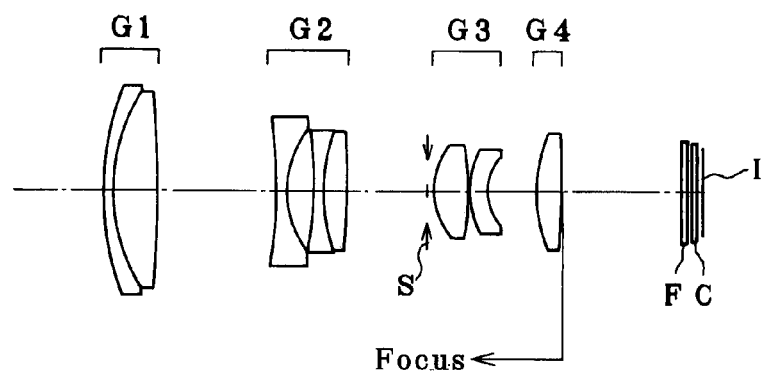
Figure 1C:
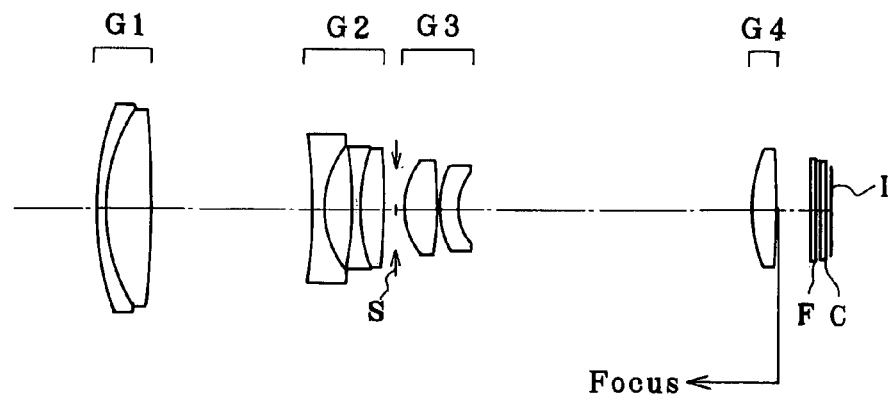
Figure 2A:
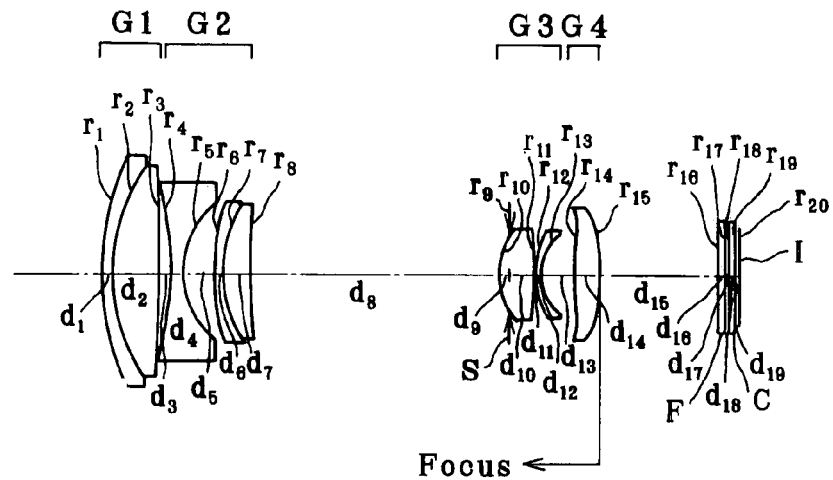
FIG. 2 is illustrative, as in FIG. 1, of Example 2 of the inventive zoom lens.
Figure 2B:
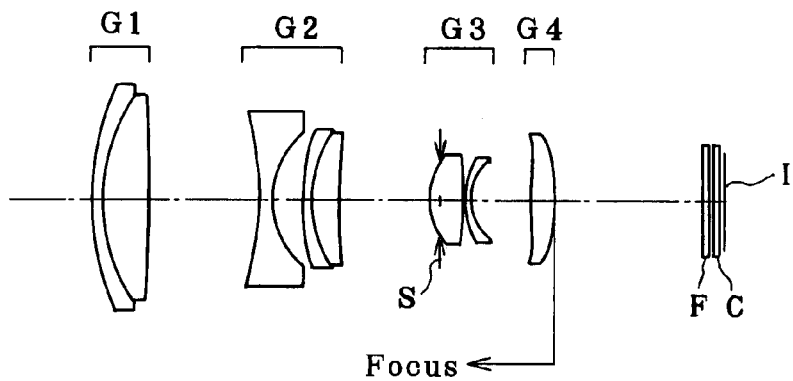
Figure 2C:
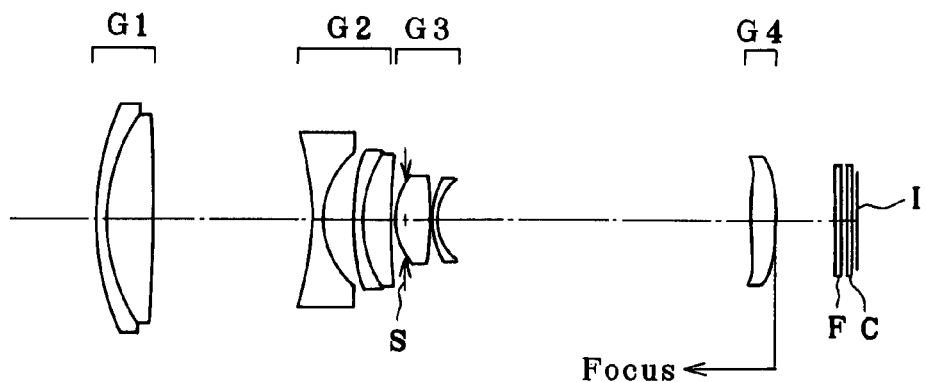
Figure 3A:
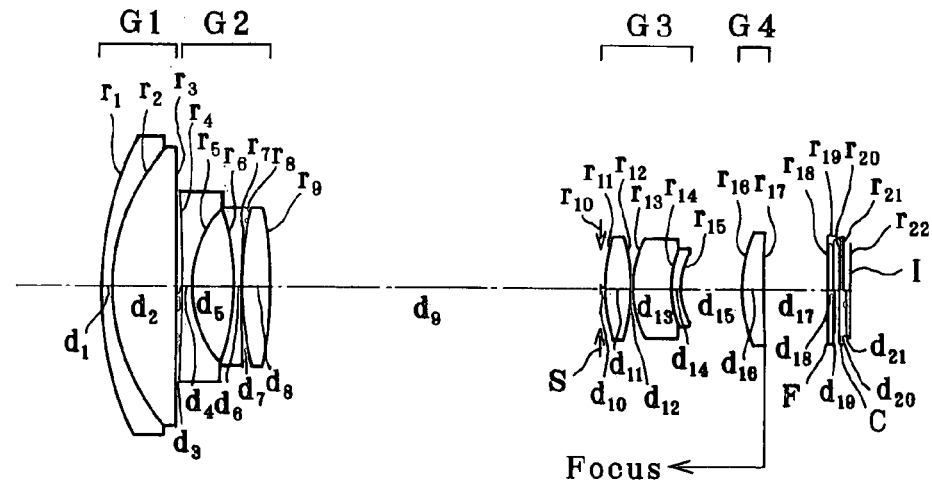
FIG. 3 is illustrative, as in FIG. 1, of Example 3 of the inventive zoom lens.
Figure 3B:
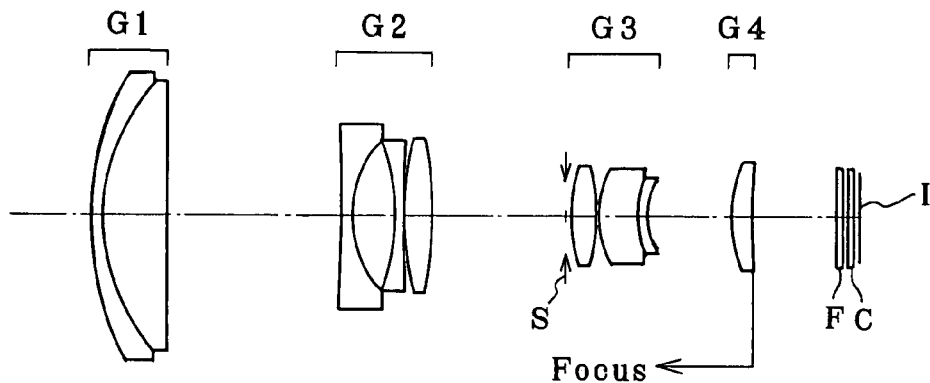
Figure 3C:
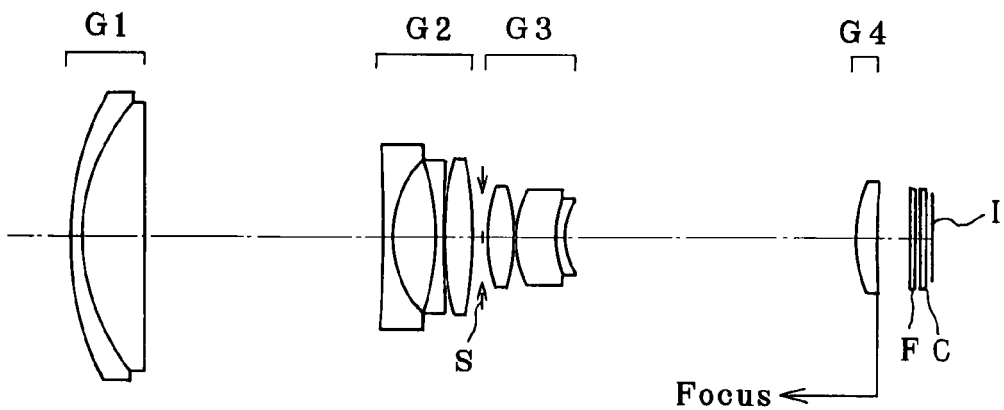

The zoom lens of the invention is now explained with reference to Examples 1, 2 and 3. FIGS. 1, 2 and 3 are illustrative in lens arrangement section of Examples 1, 2 and 3 at the wide-angle ends (a), in the intermediate states (b) and at the telephoto ends (c), respectively, upon focusing on an infinite object point. Throughout FIGS. 1 to 3, G1 stands for the first lens group, G2 the second lens group, S an aperture stop, G3 the third lens group, G4 the fourth lens group, F a plane-parallel plate that forms an optical low-pass filter with an IR cut coat applied on it, etc., G a plane-parallel plate for a cover glass of an electronic imaging device (CCD or C-MOS), and I the image plane (of the light receiving surface of the electronic imaging device). It is noted that the cover glass G may have been provided on its surface with a wavelength limiting multilayer film, and that cover glass G may also have a low-pass filter function.

EXAMPLE 1

As shown in FIG. 1, this example is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power. Upon zooming from the wide-angle end to the telephoto end of the zoom lens, the first lens group G1 moves toward the object side, and the second lens group G2 moves in a concave orbit toward the object side with a widening spacing between the first lens group G1 and it, and is positioned a bit more on an image side at the telephoto end than at the wide-angle end. The aperture stop S and the third lens group G3 move together monotonously toward the object side while the spacing between the second lens group G2 and it becomes narrow. The fourth lens group G4 moves in a convex orbit toward the object side while the spacing between the third lens group G3 and it becomes wide, and is positioned more on the image side at the telephoto end than at the wide-angle end.

In order from the object side of the zoom lens, the first lens group G1 is made up of a cemented lens of a negative meniscus lens convex on its object side and a double-convex positive lens; the second lens group G2 is made up of a double-concave negative lens and a cemented lens of a double-concave negative lens and a double-convex positive lens; the third lens group G3 is made up of a double-convex positive lens and a negative meniscus lens convex on its object side; and the fourth lens group G4 is made up of one double-convex positive lens.

Ten aspheric surfaces are used: on at the surface of the cemented lens in the first lens group G1, which surface is nearest to the image side, two at both surfaces of the single double-concave negative lens in the second lens group G2, one at the surface of the cemented lens in the second lens group G2, which surface is nearest to the object side, and six at all lens surfaces in the third G3 and the fourth lens group G4.

Focusing is implemented by extending the fourth lens group G4 toward the object side, although focusing may be implemented by other lens group, too.

EXAMPLE 2

As shown in FIG. 2, this example is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power. Upon zooming from the wide-angle end to the telephoto end of the zoom lens, the first lens group G1 moves in a concave orbit toward the object side and is positioned more on an image side at the telephoto end than at the wide-angle end. The second lens group G2 moves in a concave orbit toward the object side with a widening spacing between the first lens group G1 and it, and is positioned more on an image side at the telephoto end than at the wide-angle end. The aperture stop S and the third lens group G3 move together monotonously toward the object side while the spacing between the second lens group G2 and it becomes narrow. The fourth lens group G4 moves in a convex orbit toward the object side while the spacing between the third lens group G3 and it becomes wide, and is positioned more on the image side at the telephoto end than at the wide-angle end.

In order from the object side of the zoom lens, the first lens group G1 is made up of a cemented lens of a negative meniscus lens convex on its object side and a double-convex positive lens; the second lens group G2 is made up of a double-concave negative lens and a cemented lens of a negative meniscus lens convex on its object side and a positive meniscus lens convex on its object side; the third lens group G3 is made up of a double-convex positive lens and a negative meniscus lens convex on its object side; and the fourth lens group G4 is made up of one double-convex positive lens.

Eight aspheric surfaces are used: one at the surface of the cemented lens in the first lens group G1, which surface is nearest to the image side, two at both surfaces of the double-concave negative lens in the second lens group G2, one at the surface of the cemented lens in the second lens group G2, which surface is nearest to the object side, two at both surfaces of the double-convex positive lens in the third lens group G3 and two at both surfaces of the double-convex positive lens in the fourth lens group G4. Note here that the aperture stop S is positioned more on the image side than the object-side surface of the double-convex positive lens in the third lens group G3.

Focusing is implemented by extending the fourth lens group G4 toward the object side, although focusing may be implemented by other lens group, too.

EXAMPLE 3

As shown in FIG. 3, this example is directed to a zoom lens made up of, in order from its object side, the first lens group G1 of positive refracting power, the second lens group G2 of negative refracting power, the aperture stop S, the third lens group G3 of positive refracting power and the fourth lens group G4 of positive refracting power. Upon zooming from the wide-angle end to the telephoto end of the zoom lens, the first lens group G1 moves toward the object side, and the second lens group G2 moves in a concave orbit toward the object side while the spacing between the first lens group G1 and it becomes wide, and is positioned more on the image side at the telephoto end than at the wide-angle end. The aperture stop S and the third lens group G3 move together toward the object side while the spacing between the second lens group G3 and it becomes narrow. The fourth lens group G4 moves in a convex orbit toward the object side while the spacing between the third lens group G3 and it becomes wide, and is positioned more on the image side at the telephoto side than at the wide-angle end.

In order from the object side of the zoom lens, the first lens group G1 is made up of a cemented lens of a negative meniscus lens convex on its object side and a positive meniscus lens convex on its object side; the second lens group G2 is made up of two double-concave negative lenses and a double-convex positive lens; the third lens group G3 is made up of a double-convex positive lens and a cemented lens of a positive meniscus lens convex on its object side and a negative meniscus lens convex on its object side; and the fourth lens group G4 is made up of one positive meniscus lens convex on its object side.

Four aspheric surfaces are used: two at both surfaces of the double-convex positive lens in the third lens group G3 and two at both surfaces of the positive meniscus lens in the fourth lens group G4.

Focusing is implemented by extending the fourth lens group G4 toward the object side, although focusing may be implemented by other lens group, too.

Numerical data about each of Examples 1, 2 and 3 are enumerated below. The symbols used hereinafter but not hereinbefore have the following meanings.

f: focal length of the zoom lens system,
$F_{NO}$: F-number,
2ω: full angle of view,
WE: wide-angle end,
ST: intermediate state,
TE: telephoto end,
$r_1, r_2 \ldots$: radius of curvature of each lens surface,
$d_1, d_2 \ldots$: space between adjacent lens surfaces,
$n_{d1}, n_{d2} \ldots$: d-line refractive index of each lens, and
$\nu_{d1}, \nu_{d2} \ldots$: Abbe number of each lens.

Here let x be an optical axis provided that the direction of travel of light is taken as positive and y be a direction orthogonal to the optical axis. Then, aspheric shape is given by $$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4, A_6, A_8$ and $A_{10}$ are the $4^{th}$-, $6^{th}$-, $8^{th}$-, and $10^{th}$-order aspheric coefficients, respectively.

EXAMPLE 1

| | | | |
|---|---|---|---|
| $r_1 = 26.441$ | $d_1 = 1.00$ | $n_{d1} = 2.00170$ | $\nu_{d1} = 20.64$ |
| $r_2 = 17.392$ | $d_2 = 3.95$ | $n_{d2} = 1.76802$ | $\nu_{d2} = 49.24$ |
| $r_3 = -99.096$ | $d_3 = $ (Variable) | | |
| (Aspheric) | | | |
| $r_4 = -191.773$ | $d_4 = 1.00$ | $n_{d3} = 1.88300$ | $\nu_{d3} = 40.76$ |
| (Aspheric) | | | |
| $r_5 = 9.192$ (Aspheric) | $d_5 = 2.50$ | | |
| $r_6 = -22.216$ | $d_6 = 0.80$ | $n_{d4} = 1.88300$ | $\nu_{d4} = 40.76$ |
| (Aspheric) | | | |
| $r_7 = 15.409$ | $d_7 = 2.25$ | $n_{d5} = 2.00170$ | $\nu_{d5} = 20.64$ |
| $r_8 = -56.881$ | $d_8 = $ (Variable) | | |
| $r_9 = \infty$ (Stop) | $d_9 = 0.50$ | | |
| $r_{10} = 5.818$ (Aspheric) | $d_{10} = 3.20$ | $n_{d6} = 1.49700$ | $\nu_{d6} = 81.54$ |
| $r_{11} = -34.734$ | $d_{11} = 0.10$ | | |
| (Aspheric) | | | |
| $r_{12} = 7.753$ (Aspheric) | $d_{12} = 1.62$ | $n_{d7} = 1.84666$ | $\nu_{d7} = 23.78$ |
| $r_{13} = 4.527$ (Aspheric) | $d_{13} = $ (Variable) | | |
| $r_{14} = 13.155$ | $d_{14} = 2.20$ | $n_{d8} = 1.49700$ | $\nu_{d8} = 81.54$ |
| (Aspheric) | | | |
| $r_{15} = -156.816$ | $d_{15} = $ (Variable) | | |
| (Aspheric) | | | |
| $r_{16} = \infty$ | $d_{16} = 0.50$ | $n_{d9} = 1.54771$ | $\nu_{d9} = 62.84$ |
| $r_{17} = \infty$ | $d_{17} = 0.50$ | | |
| $r_{18} = \infty$ | $d_{18} = 0.50$ | $n_{d10} = 1.51633$ | $\nu_{d10} = 64.14$ |
| $r_{19} = \infty$ | $d_{19} = 0.41$ | | |

-continued

| | |
|---|---|
| $r_{20} = \infty$ | |
| (Imaging plane) | |

Aspherical Coefficients

3rd surface $K = 0.000$
$A_4 = 5.63459 \times 10^{-6}$
$A_6 = -1.18044 \times 10^{-9}$
$A_8 = -1.70586 \times 10^{-11}$
$A_{10} = 0$ 4th surface $K = 0.000$
$A_4 = -1.54983 \times 10^{-4}$
$A_6 = -8.65190 \times 10^{-7}$
$A_8 = 2.35494 \times 10^{-8}$
$A_{10} = 0$ 5th surface $K = 0.000$
$A_4 = 2.96564 \times 10^{-5}$
$A_6 = 3.83241 \times 10^{-6}$
$A_8 = -2.66946 \times 10^{-8}$
$A_{10} = 0$ 6th surface $K = 0.000$
$A_4 = 2.13456 \times 10^{-4}$
$A_6 = 4.91618 \times 10^{-6}$
$A_8 = -1.66310 \times 10^{-8}$
$A_{10} = 0$ 10th surface $K = -0.527$
$A_4 = -1.39959 \times 10^{-4}$
$A_6 = -6.45759 \times 10^{-6}$
$A_8 = 2.84186 \times 10^{-7}$
$A_{10} = -1.67153 \times 10^{-8}$ 11th surface $K = 3.946$
$A_4 = -9.31231 \times 10^{-5}$
$A_6 = -3.47217 \times 10^{-6}$
$A_8 = 1.91271 \times 10^{-7}$
$A_{10} = -1.20338 \times 10^{-8}$ 12th surface $K = 0.000$
$A_4 = -1.91512 \times 10^{-4}$
$A_6 = -9.96001 \times 10^{-7}$
$A_8 = 1.03747 \times 10^{-9}$
$A_{10} = 0$ 13th surface $K = 0.000$
$A_4 = -7.69643 \times 10^{-5}$
$A_6 = -5.20371 \times 10^{-9}$
$A_8 = 1.75203 \times 10^{-9}$
$A_{10} = 0$ 14th surface $K = 0.283$
$A_4 = -3.44497 \times 10^{-5}$
$A_6 = -1.44842 \times 10^{-6}$
$A_8 = -7.76251 \times 10^{-8}$
$A_{10} = -1.04632 \times 10^{-9}$ 15th surface $K = 0.000$
$A_4 = 5.01569 \times 10^{-5}$
$A_6 = 5.86547 \times 10^{-8}$ -continued $A_8 = -3.10515 \times 10^{-7}$
$A_{10} = 4.71891 \times 10^{-9}$ Zooming Data (∞)

|  | WE | ST | TE |
|---|---|---|---|
| f (mm) | 6.69 | 22.01 | 64.40 |
| $F_{NO}$ | 2.90 | 3.95 | 4.90 |
| 2ω (°) | 69.44 | 18.98 | 6.59 |
| $d_3$ | 0.50 | 10.61 | 14.68 |
| $d_8$ | 19.85 | 7.04 | 1.00 |
| $d_{13}$ | 2.49 | 4.61 | 26.53 |
| $d_{15}$ | 8.33 | 10.77 | 2.92 |

EXAMPLE 2

| | | | |
|---|---|---|---|
| $r_1 = 23.809$ | $d_1 = 1.00$ | $n_{d1} = 2.00170$ | $\nu_{d1} = 20.64$ |
| $r_2 = 16.163$ | $d_2 = 4.10$ | $n_{d2} = 1.76802$ | $\nu_{d2} = 49.24$ |
| $r_3 = -117.361$ (Aspheric) | $d_3$ = (Variable) | | |
| $r_4 = -15.370$ (Aspheric) | $d_4 = 1.00$ | $n_{d3} = 1.80610$ | $\nu_{d3} = 40.92$ |
| $r_5 = 8.729$ (Aspheric) | $d_5 = 2.60$ | | |
| $r_6 = 24.332$ (Aspheric) | $d_6 = 0.80$ | $n_{d4} = 1.80610$ | $\nu_{d4} = 40.92$ |
| $r_7 = 9.689$ | $d_7 = 2.40$ | $n_{d5} = 2.00170$ | $\nu_{d5} = 20.64$ |
| $r_8 = 35.185$ | $d_8$ = (Variable) | | |
| $r_9 = \infty$ (Stop) | $d_9 = -1.00$ | | |
| $r_{10} = 5.112$ (Aspheric) | $d_{10} = 3.10$ | $n_{d6} = 1.49700$ | $\nu_{d6} = 81.54$ |
| $r_{11} = -111.184$ (Aspheric) | $d_{11} = 0.10$ | | |
| $r_{12} = 6.163$ | $d_{12} = 0.45$ | $n_{d7} = 1.84666$ | $\nu_{d7} = 23.78$ |
| $r_{13} = 4.167$ | $d_{13}$ = (Variable) | | |
| $r_{14} = 29.093$ (Aspheric) | $d_{14} = 2.20$ | $n_{d8} = 1.49700$ | $\nu_{d8} = 81.54$ |
| $r_{15} = -23.912$ (Aspheric) | $d_{15}$ = (Variable) | | |
| $r_{16} = \infty$ | $d_{16} = 0.50$ | $n_{d9} = 1.54771$ | $\nu_{d9} = 62.84$ |
| $r_{17} = \infty$ | $d_{17} = 0.50$ | | |
| $r_{18} = \infty$ | $d_{18} = 0.50$ | $n_{d10} = 1.51633$ | $\nu_{d10} = 64.14$ |
| $r_{19} = \infty$ | $d_{19} = 0.40$ | | |
| $r_{20} = \infty$ (Imaging plane) | | | |

Aspherical Coefficients

3rd surface

K = 0.000
$A_4 = 7.53316 \times 10^{-6}$
$A_6 = -1.21007 \times 10^{-8}$
$A_8 = 3.56951 \times 10^{-11}$
$A_{10} = 0$ 4th surface K = 0.000
$A_4 = 4.32539 \times 10^{-4}$
$A_6 = -3.97769 \times 10^{-6}$
$A_8 = 2.06282 \times 10^{-8}$
$A_{10} = 0$ 5th surface K = 0.000
$A_4 = 5.18041 \times 10^{-5}$
$A_6 = 1.25895 \times 10^{-5}$
$A_8 = -5.39018 \times 10^{-8}$
$A_{10} = 0$ 6th surface K = 0.000
$A_4 = -5.28943 \times 10^{-5}$
$A_6 = 7.55780 \times 10^{-6}$ $A_8 = -2.89516 \times 10^{-8}$
$A_{10} = 0$ 10th surface K = -0.943
$A_4 = 3.40587 \times 10^{-4}$
$A_6 = -3.06992 \times 10^{-6}$
$A_8 = 2.74113 \times 10^{-7}$
$A_{10} = -1.68783 \times 10^{-8}$ 11th surface K = 2.757
$A_4 = 1.04729 \times 10^{-4}$
$A_6 = -9.48260 \times 10^{-6}$
$A_8 = 1.90465 \times 10^{-7}$
$A_{10} = -1.22181 \times 10^{-8}$ 14th surface K = -1.077
$A_4 = -2.57269 \times 10^{-4}$
$A_6 = -6.53299 \times 10^{-6}$
$A_8 = -1.62104 \times 10^{-7}$
$A_{10} = -2.14170 \times 10^{-9}$ 15th surface K = 0.000
$A_4 = -2.59178 \times 10^{-4}$
$A_6 = -5.19174 \times 10^{-6}$
$A_8 = -3.14738 \times 10^{-7}$
$A_{10} = 4.88098 \times 10^{-9}$ Zooming Data (∞)

|  | WE | ST | TE |
|---|---|---|---|
| f (mm) | 6.73 | 21.39 | 64.39 |
| $F_{NO}$ | 2.80 | 3.36 | 5.33 |
| 2ω (°) | 66.93 | 19.73 | 6.72 |
| $d_3$ | 1.00 | 9.75 | 13.81 |
| $d_8$ | 23.12 | 9.07 | 1.40 |
| $d_{13}$ | 3.10 | 5.35 | 27.59 |
| $d_{15}$ | 10.05 | 12.59 | 4.98 |

EXAMPLE 3

| | | | |
|---|---|---|---|
| $r_1 = 28.071$ | $d_1 = 1.00$ | $n_{d1} = 2.00069$ | $\nu_{d1} = 25.46$ |
| $r_2 = 18.303$ | $d_2 = 5.90$ | $n_{d2} = 1.74320$ | $\nu_{d2} = 49.34$ |
| $r_3 = 787.550$ | $d_3$ = (Variable) | | |
| $r_4 = -354.880$ | $d_4 = 1.00$ | $n_{d3} = 1.88300$ | $\nu_{d3} = 40.76$ |
| $r_5 = 9.906$ | $d_5 = 3.80$ | | |
| $r_6 = -19.516$ | $d_6 = 0.80$ | $n_{d4} = 1.88300$ | $\nu_{d4} = 40.76$ |
| $r_7 = 136.347$ | $d_7 = 0.10$ | | |
| $r_8 = 29.976$ | $d_8 = 2.50$ | $n_{d5} = 1.92286$ | $\nu_{d5} = 20.88$ |
| $r_9 = -40.507$ | $d_9$ = (Variable) | | |
| $r_{10} = \infty$ (Stop) | $d_{10} = 0.50$ | | |
| $r_{11} = 12.136$ (Aspheric) | $d_{11} = 2.30$ | $n_{d6} = 1.49700$ | $\nu_{d6} = 81.54$ |
| $r_{12} = -25.267$ (Aspheric) | $d_{12} = 0.10$ | | |
| $r_{13} = 8.094$ | $d_{13} = 3.77$ | $n_{d7} = 1.74320$ | $\nu_{d7} = 49.34$ |
| $r_{14} = 9.619$ | $d_{14} = 0.70$ | $n_{d8} = 2.00170$ | $\nu_{d8} = 20.64$ |
| $r_{15} = 5.417$ | $d_{15}$ = (Variable) | | |
| $r_{16} = 11.630$ (Aspheric) | $d_{16} = 2.00$ | $n_{d9} = 1.53113$ | $\nu_{d9} = 55.80$ |
| $r_{17} = 89.127$ (Aspheric) | $d_{17}$ = (Variable) | | |
| $r_{18} = \infty$ | $d_{18} = 0.50$ | $n_{d10} = 1.54771$ | $\nu_{d10} = 62.84$ |
| $r_{19} = \infty$ | $d_{19} = 0.50$ | | |

-continued

| $r_{20} = \infty$ | $d_{20} = 0.50$ | $n_{d11} = 1.51633$ | $\nu_{d11} = 64.14$ |
| $r_{21} = \infty$ | $d_{21} = 0.40$ | | |
| $r_{22} = \infty$ | | | |
| (Imaging plane) | | | |

Aspherical Coefficients

11th surface $K = 0.890$
$A_4 = -2.43409 \times 10^{-4}$
$A_6 = -9.55187 \times 10^{-6}$
$A_8 = 2.84768 \times 10^{-7}$
$A_{10} = -1.66816 \times 10^{-8}$ 12th surface $K = 4.073$
$A_4 = -4.71267 \times 10^{-5}$
$A_6 = -7.23416 \times 10^{-6}$
$A_8 = 1.62747 \times 10^{-7}$
$A_{10} = -1.21230 \times 10^{-8}$ 16th surface $K = 1.512$
$A_4 = -4.92552 \times 10^{-5}$
$A_6 = -1.74926 \times 10^{-6}$
$A_8 = -7.82319 \times 10^{-8}$
$A_{10} = -1.02774 \times 10^{-9}$ 17th surface $K = 0.000$
$A_4 = 1.81227 \times 10^{-4}$
$A_6 = 1.98411 \times 10^{-6}$
$A_8 = -3.04886 \times 10^{-7}$
$A_{10} = 4.71106 \times 10^{-9}$ Zooming Data ($\infty$)

| | WE | ST | TE |
|---|---|---|---|
| f (mm) | 6.80 | 21.31 | 66.10 |
| $F_{NO}$ | 2.90 | 3.50 | 4.90 |
| 2ω (°) | 65.39 | 19.90 | 6.43 |
| $d_3$ | 0.50 | 16.23 | 21.83 |
| $d_9$ | 30.54 | 12.36 | 1.00 |
| $d_{15}$ | 5.74 | 7.82 | 26.80 |
| $d_{17}$ | 5.90 | 7.77 | 3.00 |

Figure 4A:
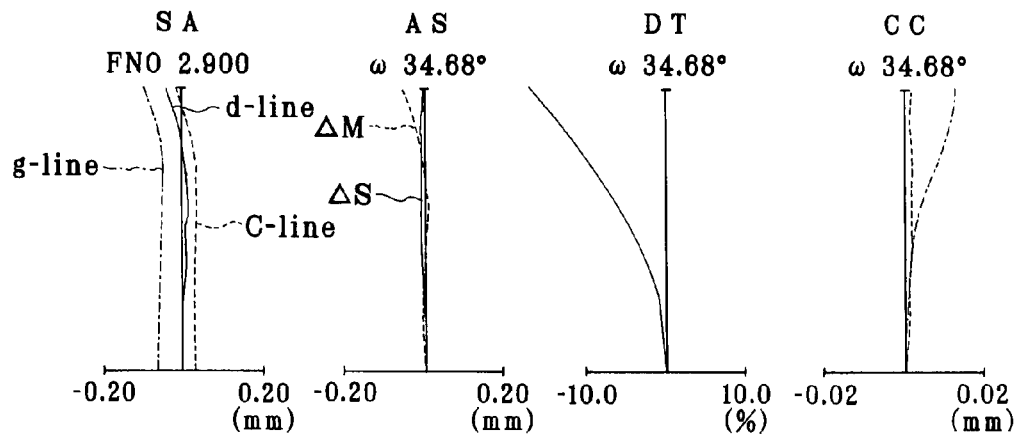
FIG. 4 is indicative of aberrations of Example 1 upon focusing on an object point at infinity.
Figure 4B:
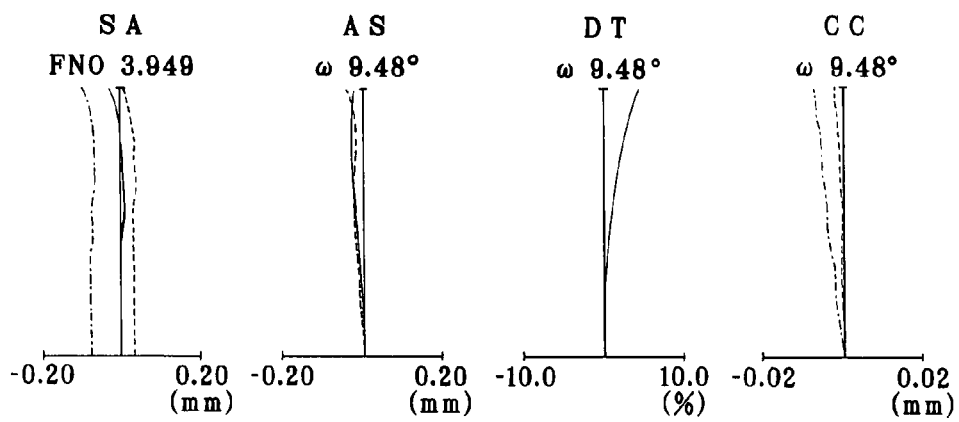
Figure 4C:
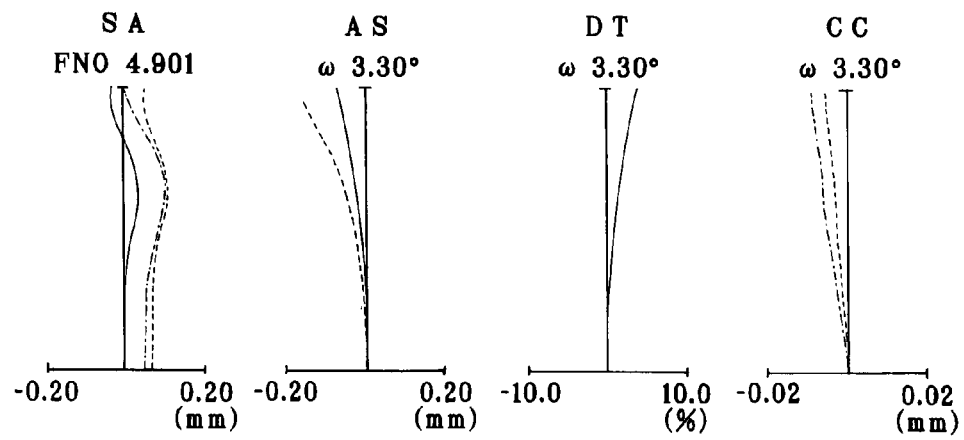
Figure 5A:
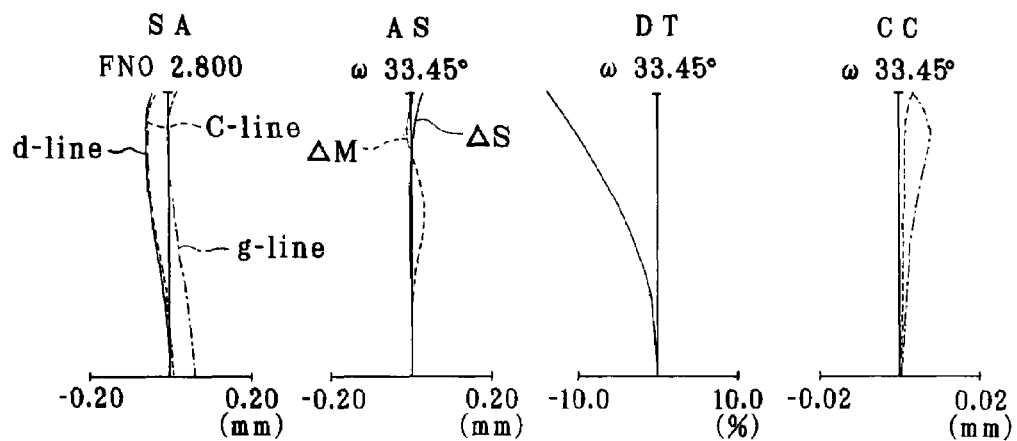
FIG. 5 is indicative of aberrations of Example 2 upon focusing at an object point at infinity.
Figure 5B:
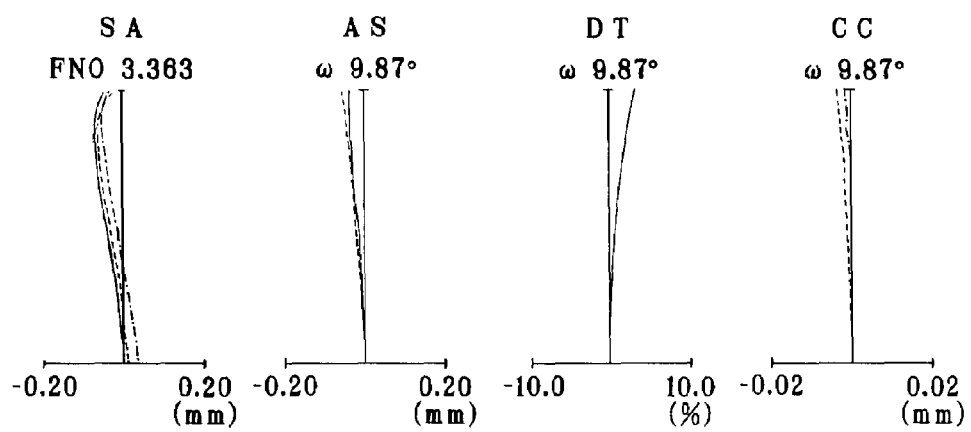
Figure 5C:
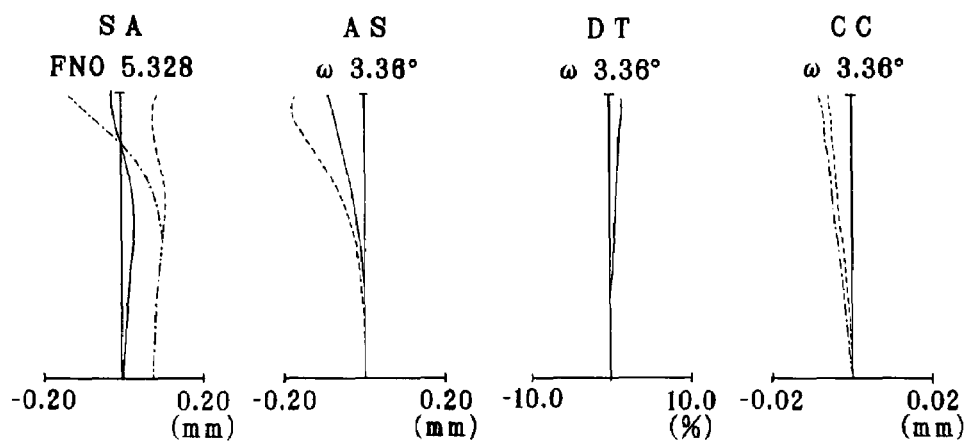
Figure 6A:
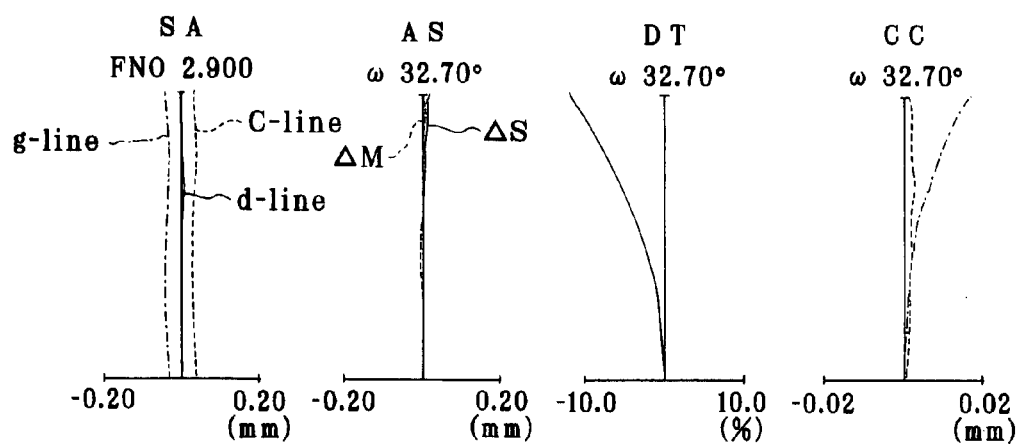
FIG. 6 is indicative of aberrations of Example 3 upon focusing on an object point at infinity.
Figure 6B:
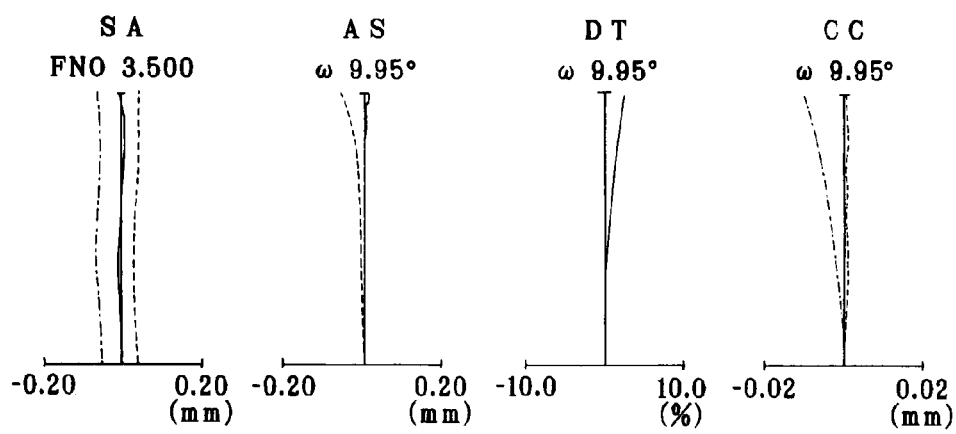
Figure 6C:
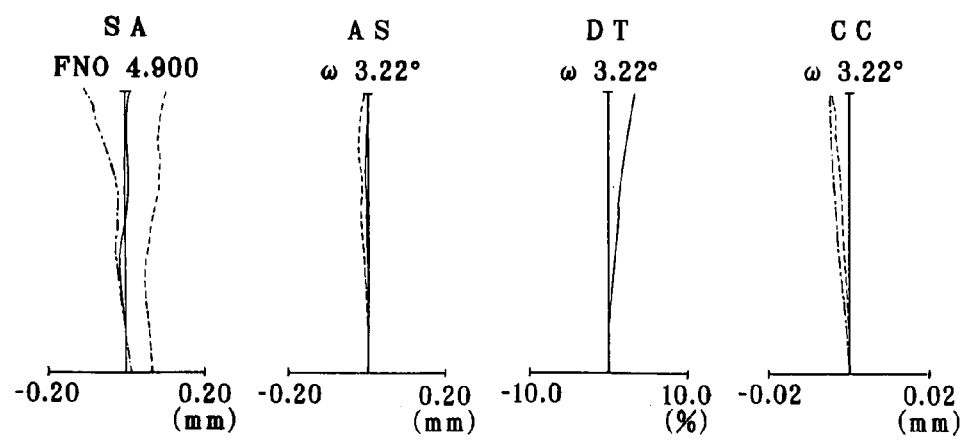

FIGS. 4, 5 and 6 are aberration diagrams indicative of spherical aberration (SA), astigmatism (AS), distortion (DT) and chromatic aberration of magnification (CC) at the wide-angle ends (a), in intermediate states (b) and at the telephoto ends (c) of Examples 1, 2 and 3, respectively, upon focusing on an infinite object point. In FIGS. 4, 5 and 6, "ω" stands for a half angle of view (°).

The values of conditions (1) to (17) in Examples 1, 2 and 3 are given below.

| | Example | | |
|---|---|---|---|
| | 1 | 2 | 3 |
| Cond. (1) | −0.45 | −0.5 | −0.4 |
| Cond. (2), (12) | 9.62 | 9.57 | 9.73 |
| Cond. (3) | 2.78 | 2.89 | 2.67 |
| Cond. (4) | −0.81 | −0.75 | −0.43 |
| Cond. (5) | 2.09 | 1.56 | 1.47 |
| Cond. (6), (14) | −17.2 | −13.6 | −12.0 |
| Cond. (7), (13) | 81.5 | 81.5 | 81.5 |
| Cond. (8), (15) | 20.6 | 20.6 | 25.5 |
| Cond. (9), (16) | 2.013 | 2.013 | 2.001 |
| Cond. (10), (17) | −3.81 | −5.17 | — |
| Cond. (11) | 3.95 | 4.1 | — |

By the way, an antireflection coating is generally applied to the air contact surface of a lens for the purpose of preventing ghosts and flares. At the cementing surface of the cemented lens, on the other hand, the refractive index of the adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have grown popularity, and they have often been used with camera optical systems for the reasons of their enhanced effect on correction of aberrations. When a high-refractive-index vitreous material is used as a cemented lens, the reflection of light off the cementing surface would also be not negligible. In such a case, it would be particularly effective to have an antireflection coating applied on the cementing surface.

Effective use of cementing surface coating is disclosed in JP(A)'s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the examples of the invention, too, it goes without saying that the cementing surface coating on the basis of the same idea takes effect.

Depending on the refractive index of the lens involved and the refractive index of the adhesive material used, use may be made of coating materials of relatively high refractive index such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive index such as $MgF_2$, $SiO_2$, and $Al_2O_3$. These coating materials may then have a suitable thickness selected in such a way as to meet phase conditions.

As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc.

And now, with the zoom lens of the invention, image distortion may be corrected in an electrically digital way. The basic concept of how image distortion is digitally corrected is now explained.

Figure 7:
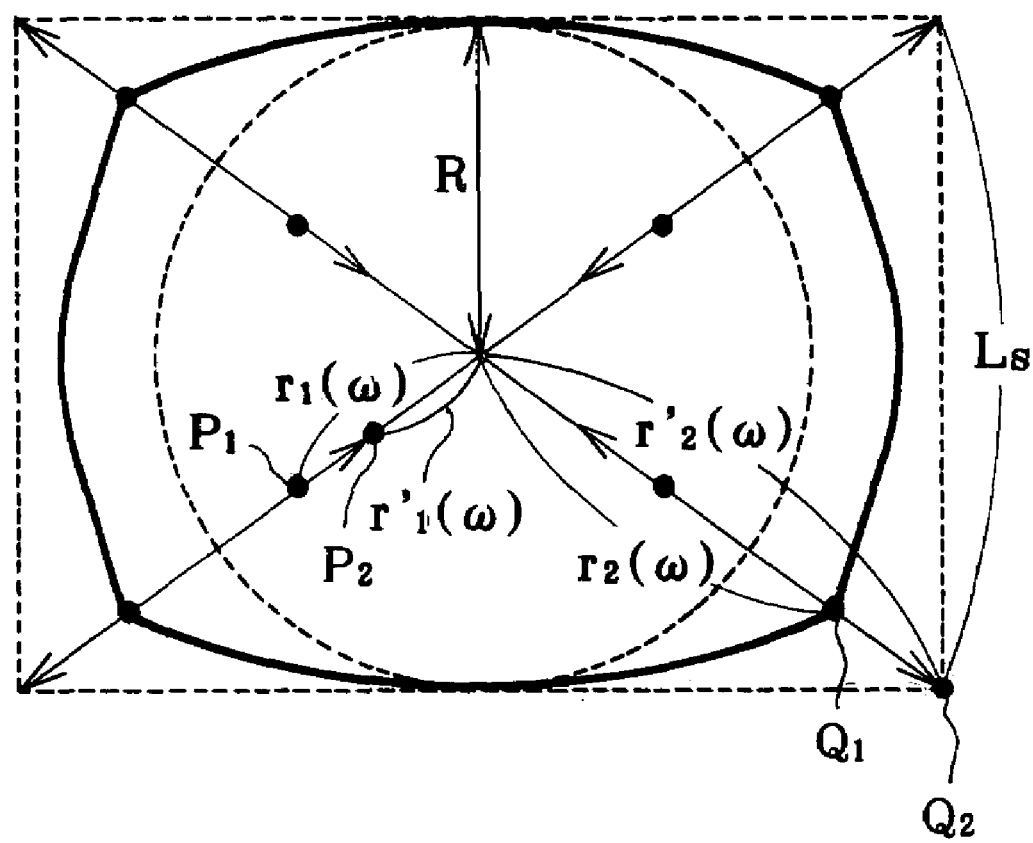
FIG. 7 is illustrative of the basic conception of how to digitally correct image distortion.

As shown typically in FIG. 7, there is magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius r(ω) are moved in substantially radial directions; they are concentrically moved to a radius r' (ω) for correction. In FIG. 7 as an example, a point $P_1$ on the circumference of an arbitrary circle of radius $r_1$ (ω) positioned inside the circle of radius R is moved to a point $P_2$ on the circumference of an arbitrary circle of radius $r_1'(\omega)$ to be corrected in a direction toward the center of the circle. On the other hand, a point $Q_1$ on the circumference of an arbitrary circle of radius $r_2(\omega)$ positioned outside the circle of radius R is moved to a point Q2 on the circumference of a circle of radius $r_2'(\omega)$ to be corrected in a direction away from the center of the circle. Here, $r'(\omega)$ is represented by $$r'(\omega)=\alpha f \tan \omega \ (0 \leq \alpha \leq 1)$$

where $\omega$ is a subject half angle of view, and f is the focal length of an imaging optical system (the zoom lens in the invention).

Here let Y be an ideal image height on the aforesaid circle of radius R. Then, $$\alpha=R/Y=R/f\tan \omega$$

The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, magnification on the circumference (image height) of the circle of radius R inscribed in the long side of an effective imaging plane with the point of intersection of an optical axis with the imaging plane as a center, and moving points on the circumference (image height) of other arbitrary circle of radius $r(\omega)$ moved in substantially radial directions to move them concentrically to radius $r'(\omega)$.

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid magnification. It is therefore preferable to make use of a method that determines coordinates $(X_i', Y_j')$ for where the points are to be moved to per each pixel $(X_i, Y_j)$. Note that when two or more points $(X_i, Y_j)$ are moved to the coordinates $(X_i', Y_j')$, there is the average of the values the respective pixels have taken, and when there are no incoming points, interpolation may be implemented using the values of the coordinates $(X_i', Y_j')$ for some neighboring pixels.

Such a method is effective for especially when the aforesaid circle of radius R drawn on the aforesaid optical image becomes badly distorted and asymmetric with respect to the optical axis for the reason of fabrication errors of the optical system and electronic imaging device of an electronic imaging system the zoom lens has. That method is also effective for correction of geometric distortion or the like occurring at the time of reproduction of signals as an image at the imaging device or various output devices.

With the electronic imaging system of the invention, $r(\omega)$, i.e., the relation between the half angle of view and the image height or the relation between the real image height r and the ideal image height $r'/\alpha$ may have been recorded in a recording medium built in it for the purpose of figuring out $r'(\omega)-r(\omega)$.

It is here noted that to prevent the image after the correction of distortion from running extremely short of light quantity at both ends in the short side direction, it is preferable for the aforesaid radius R to satisfy the following condition:

$$0 \leq R \leq 0.6L_s$$

where $L_s$ is the length of the short side of the effective imaging plane.

For the aforesaid radius R it is more preferable to satisfy the following condition.

$$0.3L_s \leq R \leq 0.6L_s$$

Most preferably, the aforesaid radius R should be much the same as that of a circle inscribed in the effective imaging plane in the short side direction. Note here that the correction with the magnification fixed at or near the radius R=0, viz., at or near the optical axis is somewhat disadvantageous in terms of the substantial number of images; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially $r'(\omega)=\alpha f \tan \omega$ at or near the telephoto end within the divided focal zones. In that case, however, there is some barrel distortion remaining at the wide-angle end within the divided focal zones. Too many divided zones are not that preferable because of the need of storing too much intrinsic data necessary for correction in the recording medium. Therefore, one or a few coefficients in association with the focal lengths in the divided focal zones have been figured out in advance. Such coefficients may have been determined on the basis of simulations or measuring devices. And then, there is the quantity of correction worked out corresponding to the result of correction that satisfies substantially $r'(\omega)=\alpha f \tan \omega$ at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, $$f=y/\tan \omega$$

Here y is the height (image height) of an image point from the optical axis, f is the focal length of an imaging system (the zoom lens in the invention), and $\omega$ is the angle (subject half angle of view) with the optical axis of an object point direction corresponding to an image point formed from the center on the imaging plane to the position of y.

When there is barrel distortion in the imaging system, $$f>y/\tan \omega$$

It follows that with both the focal length f of the imaging system and the image height y kept constant, the value of $\omega$ grows large.

Figure 8:
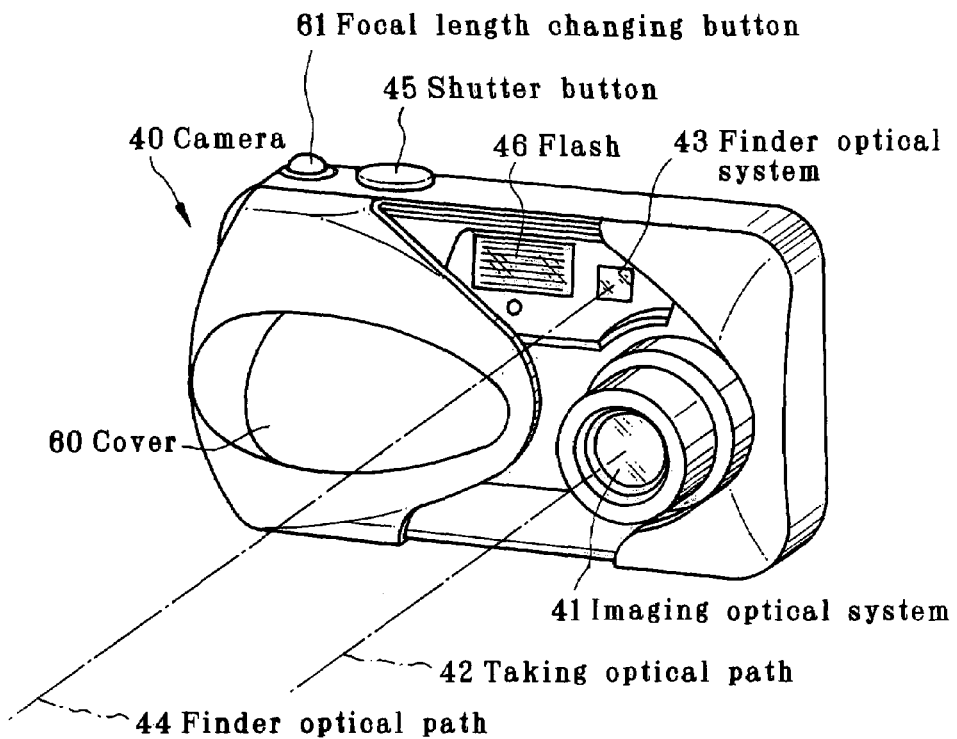
FIG. 8 is a front perspective schematic illustrative of the appearance of a digital camera according to the invention.
Figure 9:
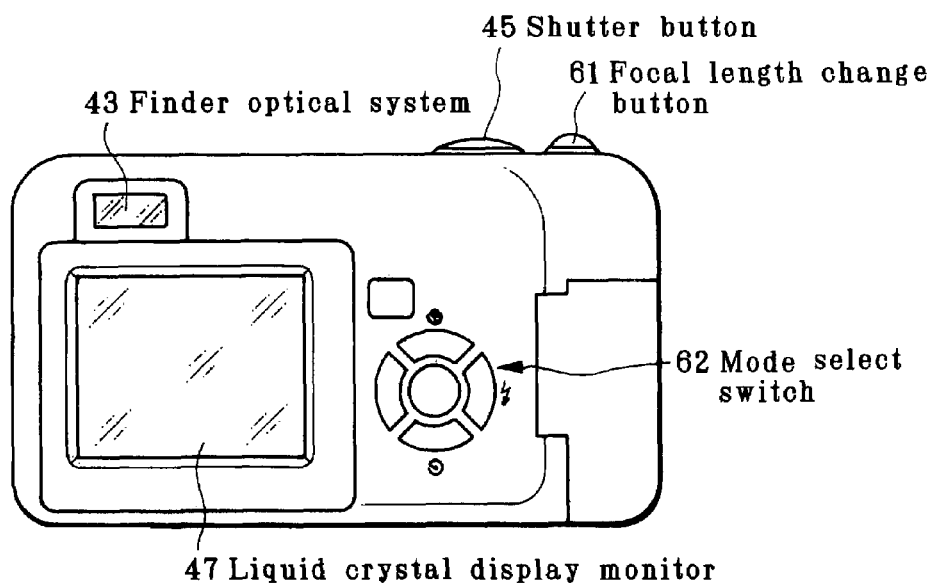
FIG. 9 is a rear perspective schematic of the digital camera of FIG. 8.
Figure 10:
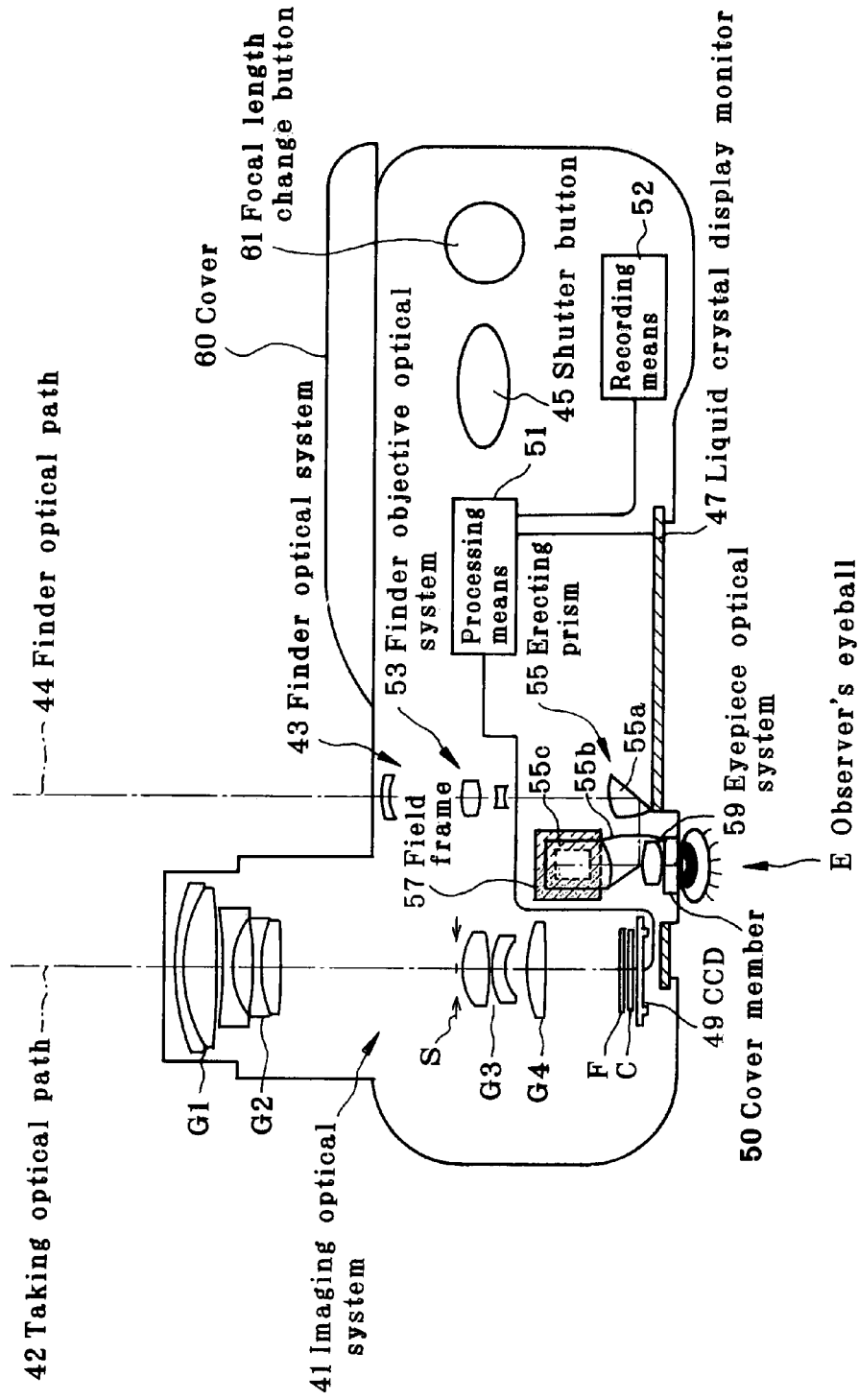
FIG. 10 is a sectional schematic of the digital camera of FIG. 8.

FIGS. 8, 9 and 10 are conceptual illustrations of a taking optical system 41 for digital cameras, in which the zoom les of the invention is incorporated. FIG. 8 is a front perspective view of the appearance of a digital camera 40; FIG. 9 is a rear perspective view of the same; and FIG. 10 is a schematic sectional view of the construction of the digital camera 40. However, FIGS. 8 and 10 show the taking optical system 41 in operation. In this embodiment, the digital camera 40 comprises a taking optical system 41 positioned on a taking optical path 42, a finder optical system 43 positioned one a finder optical path 44, a shutter 45, a flash 46, a liquid crystal monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is extended out, as in FIG. 10. the As the shutter 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric plane) of CCD 49 via a low-pass filter F with a wavelength limiting coating applied on it and a cover glass C. An object image received at CCD 49 is shown as an electronic image on the liquid crystal monitor (LCD) 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 8-10) and an erecting prism system 55 composed of erecting prisms 55a, 55b and 55c, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 11:
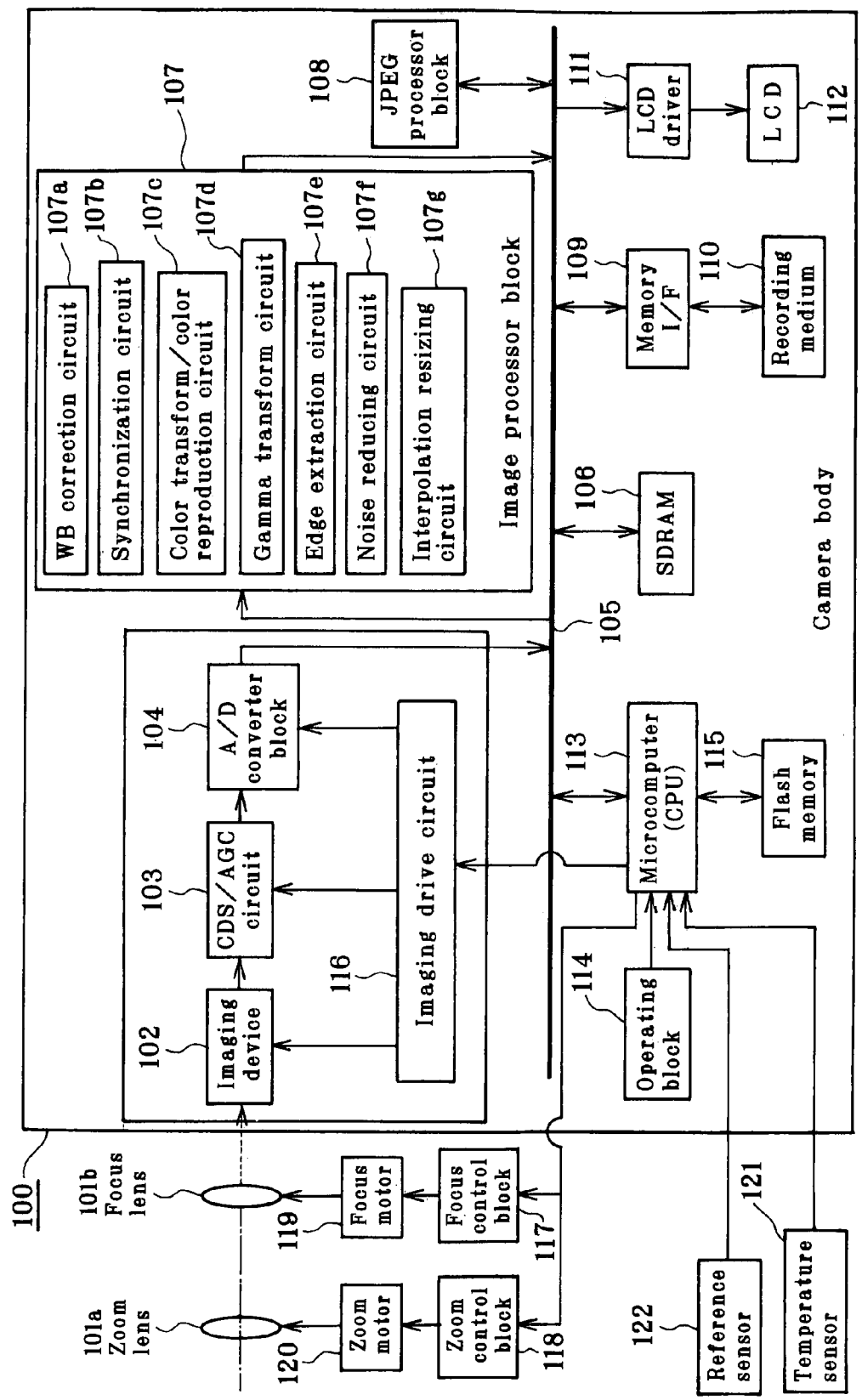
FIG. 11 is a block diagram of internal circuits in the main part of the digital camera of FIG. 8.

FIG. 11 is a block diagram for the internal circuits of the main part of the aforesaid digital camera 40. Reference is now made to FIG. 11. There is an imaging device 102 provided, in which color filters in a Bayer array are arranged on the front surface of photodiodes defined by pixels. An imaging drive circuit 116 is activated in response to an order from a microcomputer (CPU) 113. The imaging drive circuit 116 is built up of a CDS/AFC circuit comprising a CDS (correlated double sampling) for reducing a noise component and an AGC (automatic gain control) for stabilizing a signal level, and an A/D converter block for converting analog electric signals into digital electric signals.

At the imaging device 102, an object image formed via a zoom lens 101a and a focus lens 101b that form together a taking optical system is received at a photo-diode defined by each pixel. In the zoom lenses of Examples 1 to 3, it is noted that the fourth lens group G4 of each zoom lens constitutes the focus lens 101b. Then, photoelectric conversion is applied to the object image to produce the quantity of light to the CDS/AGC circuit 103 as the quantity of charges. The Bayer array here is a pixel array wherein lines each having R pixels and G (Gr) pixels alternately in the horizontal direction and lines each having G (Gr) pixels and B pixels alternately in the horizontal direction are lined up alternately in the vertical direction. It is noted that the imaging device 102 may operate in either a CMOS mode or a CCD mode. Although not illustrated, the imaging drive circuit 116 including a timing generator for driving the imaging device, CDS/AGC circuit 103 and A/D converter block 104 are each constructed of an AFE (analog front end circuit) IC device.

Suppose here that the imaging device 102 can be driven in multiple modes at least involving a pixel addition read mode and a full pixel addition read mode. The pixel addition read mode is a drive mode adapted to read a plurality of adjacent pixels after the addition of their charges, while the full pixel addition read mode is a drive mode adapted to read all charges out of the effective pixels of the imaging device.

The CDS (correlated double sampling)/AGC (auto gain control) circuit 103 applies waveform shaping to electric signals (analog image signals) read out of the imaging device 102 after reducing noises, etc., and further achieves high gain in such a way that the brightness of the image becomes the desired one. The A/D converter block 104 is adapted to convert the analog image signals pre-processed at the CDS/AGC circuit 103 into digital image signals (hereinafter called the image data).

A bus 105 is a transfer path for transferring various data produced within the camera to the respective parts of the camera, and is connected to the A/D converter block 104, SDRAM 106, an image processor block 107, a JPEG processor block 108, a memory I/F 109, an LCD driver 111 and a CPU 113. The image data garnered at A/D converter block 104 is once stored in the SDRAM 106 via the bus 105. The SDRAM 106 is adapted to temporarily store various data such as image data obtained at the A/D converter block 104, and image data processed at the image processor block 107 and JPEG processor block 108.

At the image processor block 107, the image data stored in the SDRAM 106 are read out to apply image processing to them. This image processor block 107 is constructed of a WB correction circuit 107a, a synchronization circuit 107b, a color transform/color reproduction circuit 107c, a gamma transform circuit 107d, an edge extraction circuit 107e, a noise reduction circuit 107f and an interpolation resizing circuit 107g.

The white balance (WB) correction circuit 107a multiplies R data and B data of the image data read out of the SDRAM 106 by white balance gain ordered from the CPU 113 to implement white balance correction. The synchronization circuit 107b generates from the image data produced out of the WB correction circuit 107a image data wherein three colors R, G and B constitute one pixel component. The color transform/color reproduction circuit 107c implements linear transform to multiply the image data produced out of the synchronization circuit 107b by a color matrix ordered from the CPU 113, thereby correcting the image data for colors, and changing the tint of the image by calculation using a color saturation-hue coefficient. The gamma transform circuit 107d applies gamma transform (tone transform) processing to the image data produced out of the color transform/color reproduction circuit 107c so that the tone of the image data is corrected in such a way as to fit for displaying or printing.

The edge extraction circuit 107e extracts the edge component of the image data using a BPF (band-pass filter) coefficient ordered from the CPU 113. The noise reducing circuit 107f working as a block for extracting information about a flat portion and reducing noises applies filtering to the image data using a filter parameter ordered from the CPU 113, thereby reducing noises in the image data. The interpolation resizing circuit 107g implements resizing for image data interpolation processing and for adjustment of output size as well.

At such image processor block 107 as described above, the image data already subjected to image processing are again stored in the SDRAM 106.

The JPEG processor block 108 reads out of the SDRAM 106 the image data to which image processing has been applied to implement compression in the JPEG or other mode. The JPEG processor block 108 has also another function of reading the JPEG compressed image data to be recorded in the recording medium 110 and apply extension processing to them. The image data compressed at the JPEG processor block 108 are stored in the SDRAM 106, and then recorded in the recording medium 110 via the memory I/F 109. Not exclusively, the recording medium 110 comprises a memory card detachably attached to the camera body.

The LDC driver 111 is to display an image on the LCD 112. When the JPEG compressed image data recorded in the recording medium 110 are displayed, the JPEG compressed image data recorded in the recording medium 110 are read at the JPEG processor block 108, and extension processing is then applied to them, after which they are once stored in the SDRAM 106. The LCD driver 111 reads such image data out of the SDRAM 106 and converts them into image signals, which are then displayed on the LCD 112.

The CPU 113 working as a co-taking block and a noise reduction assessment block has centralized control over various sequences in the camera body. The CPU 113 is connected with an operating block 114 and a flash memory 115 having a camera program and focus lens position data loaded in it. The operating block 114 comprises a power button, a release button, various enter keys, etc. As the operating block 114 is operated by the user, it allows the CPU 113 to implement various sequences depending on the operation of the operating block 114. The flash memory 115 is to store white balance gain, color matrix, and various parameters such as filter parameters. The CPU 113 reads from the flash memory 115 the parameters necessary for various sequences and issue orders to the respective processing blocks. A reference sensor 14 is to detect whether or not the focus lens 101b lies at a reference position. A temperature sensor 121 is to detect temperature and deliver the result of detection to the CPU 113.

The operating block 114 comprises buttons, switches, etc. for receiving various orders from the operator and delivering them to the CPU 113. Although not illustrated, for instance, it comprises a release button for instructing when to start shooting, a focus mode switch button for selecting an AF (autofocus means) mode/MF (manual focus means):(modes), an MF drive button for selectively moving the focus lens 101b at the time of MF mode selection, a preset button for storing and instructing the position data about the focus lens 101b, a preset value read button for reading and instructing the stored position data about the focus lens 101b, an infinity button for instructing the focus lens 101b to move to a position corresponding to infinity depending on a zoom ratio, etc.

The CPU 113 implements the camera program preloaded in the flash memory 115, thereby controlling the overall operation of this electronic camera. For instance, it implements AF processing (contrast AF processing) or the like on the basis of the contrast of a subject image. The contrast AF processing here means that at the AF (auto-focusing means) mode time, a subject image is taken between a near distance focus end and a far distance focus end while the focus lens 101b is driven stepwise, the contrast value of the taken subject image is detected to find a peaking contrast value, and the focusing lens group 101b is moved to a lens position having that peaking contrast value.

A zoom motor 120 drives the zoom lens 101a via a zoom control block 118 comprising a drive circuit in response to an order from the CPU 113, and a focus motor 119 drives the focus lens 101b via a focus control block 117 comprising a drive circuit in response to an order from the CPU 113. It is here noted that the focus lens 101b is driven by the focus motor 119 in both the AF (autofocus) mode and the MF mode.

FIGS. 12(a) and 12(b) are each a flowchart of image storage and what is displayed and processed. The CPU 113 implements all operation controls on an operating program stored in the flash memory 115 in it.

The flowcharts of FIGS. 12(a) and 12(b) are now explained. As shown in FIG. 12(a), there is an imaging device provided at a step S1 wherein an object image formed by way of the zoom lens 101a and 101b that are an imaging system is received at photodiodes defined by pixels.

At step S2, the CDS circuit 103 applies waveform shaping to electric signals (analog image signals) read out of the imaging device 102 after reducing reset noises, etc., and further achieves high gain in such a way that the brightness of the image becomes the desired one. Then, at A/D conversion step S3, the analog image signals pre-processed at the CDS/AGC circuit 103 are converted into digital image signals (hereinafter called the image data). At step S4, the image data obtained at the A/D conversion step S3 are once stored in SDRAM 106 by way of the bus 105. Similarly, the LCD driver 111 reads the image data out of SDRAM 106 at step S4, then converts them into image signals, and finally displays an image on the LCD 112 at step S9.

As shown in FIG. 12(b), image processing (compression) (step S5) involves WB processing for implementing white balance correction by multiplying R data and B data of the image data read out of SDRAM 106 by white balance gain ordered from CPU 113 (step S502), synchronization step (step S503) of generating image data wherein three colors R, G and B constitute one pixel component, and JPEG compression step (step S504) of compressing image data.

At step S6, various data such as image data are temporarily stored by way of the image processing (step S501) to the image processing step (step S5) via the synchronization step (step S503).

Then, at JPEG processing step S504, the JPEG compressed image data to be recorded in the recording medium 110 are read out, and the image data compressed at the JPEG processing step S504 is stored in SDRAM 106. Then, at step S8, the image data are written in the recording medium 110 via the memory I/F 109. In this way, a series to steps are over.

One example of the camera program loaded in the flash memory 115 is now explained. FIGS. 13(a) and 13(b) are one exemplary flowchart indicative of the contents of processing implemented when the focus lens at the focusing block is preset at a position in focus at infinity (position corresponding to infinity). In FIG. 13(a), as the power is put on (step S01), it causes initialization to be implemented (step S02). The initialization here means that when it is ascertained that none of position data in a memory that is storage means is loaded at the time the power is on, the zoom lens and focus lens go back to the reference position and the data in the memory are initialized. At step S21, whether the focus mode being selected is the MF mode or not is judged, and when the result of judgment is Yes, processing goes to step S22 whereas, when the answer is No, processing goes to step S23. It is noted that the focus mode is switched over to either the MF mode or the AF mode upon the focus mode select button operated (pressed down) by the operator, as already described.

As step S23, the release button is operated to judge whether or not the release button is pressed down to the first release position, and when the result of judgment is Yes, processing goes to step S24 whereas, when the answer is No, this step is repeated. At step S24, ordinary AF processing is implemented in the contrast AF mode shown in FIG. 13(b).

At step S25, whether or not the release button is pressed down to the second release position to issue a taking start order is judged, and when the result of judgment is Yes, processing goes to step S26 whereas, when the answer is No, this step is repeated. At step S26, AF processing is implemented to determine exposure conditions (shutter speed, aperture value, etc.). At step S27, exposure is implemented based on the exposure conditions determined at the previous step. That is, a subject image formed based on those exposure conditions is photo-electrically converted by CCD so that the aforesaid processing takes place at the imaging block to obtain image data that are digital electric signals. And then, given image processing such as compression processing is applied to those image data to record them in the memory card. In this way, the flow of processing is over.

Referring back to FIG. 13(b), at step S41, the focus lens moves down to the lower-limit position. At step S42, the focus lens moves a given unit amount up to the upper-limit position. At step S43, an image in a given area of the subject image formed on the imaging device is taken in to find the contrast value of the image in the given area. At step S44, whether or not there is a given contrast peak found during the movement of the focus lens from the lower-limit position to the way so far is judged, and when the result of judgment is Yes, processing goes to step S47 whereas, when the answer is No, processing goes to step S45. Thus, when that there is the contrast peak clearly found in the range of the lower-limit position to the upper-limit position is judged, the focus lens position at which that contrast peak is obtained is determined as a focus position so that the time taken by the detection of the focus position can be cut down. At step S45, whether or not the focus lens position is the upper-limit position is judged, and when the result of judgment is Yes, processing goes to step S46 whereas, when the answer is No, processing goes back to step S42. At step 46, when there is no clear contrast peak at the aforesaid processing step S43, the focus lens position having the highest contrast value, that is, the focus lens position having a contrast peak value is found from the contrast value found at the aforesaid processing step S43 and lying at a position for each unit amount from the lower-limit position to the upper-limit position. At step S47, the focus lens is moved to the focus lens position found at the previous step and having a contrast peak value, the flow of FIG. 13(b) is returned back, and processing goes back to FIG. 13(a). At step S25, whether or not the release button is pressed down to the second release position is judged, and the result of judgment is Yes, processing goes to step S26 whereas, when the answer is No, this step is repeated.

The invention claimed is:

1. A zoom lens comprising, in order from its object, a first lens group of positive refracting power, a second lens group of negative refracting power, a third lens group of positive refracting power and a fourth lens group of positive refracting power, characterized in that upon zooming from a wide-angle end to a telephoto end of the zoom lens, said first lens group, said second lens group, said third lens group and said fourth lens group each move such that an air spacing between said first lens group and said second lens group grows wide, an air spacing between said second lens group and said third lens group becomes narrow, and an air spacing between said third lens group and said fourth lens group grows wide, and said zoom lens satisfies the following conditions (1) and (2):

$$-0.7 < Mg_{w2} < -0.35 \quad (1)$$

$$9 < f_t/f_w < 20 \quad (2)$$

where $Mg_{w2}$ is a transverse magnification of the second lens group at the wide-angle end,
  $f_w$ is a focal length of the zoom lens system at the wide-angle end, and
  $f_t$ is a focal length of the zoom lens system at the telephoto end.

2. The zoom lens according to claim 1, characterized by satisfying the following condition (6):

$$-20 < Dt_w < -10 \quad (6)$$

where $Dt_w$ is distortion (%) of the maximum image height at the wide-angle end.

3. The zoom lens according to claim 1, characterized in that there is an aperture stop interposed between said second lens group and said third lens group, and upon zooming, said aperture stop moves together with said third lens group.

4. The zoom lens according to claim 1, characterized in that said third lens group comprises only one positive lens, and said positive lens satisfies the following condition (7):

$$75 < Vd_3 < 100 \quad (7)$$

where $Vd_3$ is an Abbe number of the positive lens in the third lens group.

5. The zoom lens according to claim 1, characterized in that said first lens group comprises only one positive lens, and said negative lens satisfies the following conditions (8) and (9):

$$17 < Vd_1 < 30 \quad (8)$$

$$1.9 < nd_1 < 2.3 \quad (9)$$

where $Vd_1$ is an Abbe number of the negative lens in the first lens group, and
  $nd_1$ is a d-line refractive index of the negative lens in the first lens group.

6. The zoom lens according to claim 4, characterized in that the negative lens in said third lens group satisfies the following condition (10):

$$-8 < (R_{3nb} + R_{3nf})/(R_{3nb} - R_{3nf}) < -4 \quad (10)$$

where $R_{3nf}$ is a radius of curvature near an optical axis of an object-side surface of the negative lens in the third lens group, and
  $R_{3nb}$ is a radius of curvature near the optical axis of an image-side surface of the negative lens in the third lens group.

7. The zoom lens according to claim 1, characterized in that said first lens group comprises, in order from its object side, a negative lens and a positive lens.

8. An imaging system, characterized by comprising a zoom lens as recited in claim 1, and an imaging device located on an image side of said zoom lens for converting an optical image into electric signals.

9. An image recording method, wherein an image formed through a zoom lens as recited in claim 1 is received at an imaging device; an image signal produced out of said imaging device is retained, then subjected to gain control and then subjected to A/D conversion; an image signal subjected to said A/D conversion is stored in a memory, after which an image signal read out of said memory is subjected to compression processing; and finally said image signal is recorded in a recording medium.

10. An image display method, wherein an image formed through a zoom lens as recited in claim 1 is received at an imaging device; an image signal produced out of said imaging device is retained, then subjected to gain control and then subjected to A/D conversion; and an image signal subjected to said A/D conversion is stored in a memory, after which the image signal is read out of said memory to display an image on a display.

11. A method for taking an image by means of a taking system comprising an autofocus step of implementing autofocusing having an AF processing function implemented on the basis of a contrast of a subject image and a manual focus step of manually implementing focusing, wherein:

either one of said autofocus step and said manual focus step is selected, and whether or not a taking start order is issued is judged by a taking operation member, exposure conditions are determined after the taking start order is issued, and on the basis of said exposure conditions, a subject image formed through a zoom lens as recited in claim 1 is received at an imaging device.

12. A zoom lens comprising, in order from its object side, a first lens group of positive refracting power, a second lens group of negative refracting power, a third lens group of positive refracting power and a fourth lens group of positive refracting power, characterized in that upon zooming from a wide-angle end to a telephoto end of the zoom lens, said first lens group, said second lens group, said third lens group and said fourth lens group each move such that an air spacing between said first lens group and said second lens group grows wide, an air spacing between said second lens group and said third lens group becomes narrow, and an air spacing between said third lens group and said fourth lens group grows wide, and said zoom lens satisfies the following conditions (3), (4) and (2):

$$2.5 < X_3/f_w < 5 \quad (3)$$

$$-2 < X_4/f_w < 0 \quad (4)$$

$$9 < f_t/f_w < 20 \quad (2)$$

where $f_w$ is a focal length of the zoom lens system at the wide-angle end, $f_t$ is a focal length of the zoom lens system at the telephoto end, $X_3$ is an amount of movement of the third lens group from the wide-angle end to the telephoto end (the movement of the third lens group toward the object side is taken as positive), and $X_4$ is an amount of movement of the fourth lens group from the wide-angle end to the telephoto end (the movement of the fourth lens group toward the object side is taken as positive).

13. A zoom lens comprising, in order from its object side, a first lens group of positive refracting power, a second lens group of negative refracting power, a third lens group of positive refracting power and a fourth lens group of positive refracting power, characterized in that upon zooming from the wide-angle end to the telephoto end of the zoom lens, said first lens group, said second lens group, said third lens group and said fourth lens group each move such that the air spacing between said first lens group and said second lens group grows wide, the air spacing between said second lens group and said third lens group becomes narrow, and the air spacing between said third lens group and said fourth lens group grows wide, and said zoom lens satisfies the following conditions (5), (3) and (2)

$$0 < X_1/f_w < 2 \quad (5)$$

$$2.5 < X_3/f_w < 5 \quad (3)$$

$$9 < f_t/f_w < 20 \quad (2)$$

where $f_w$ is a focal length of the zoom lens system at the wide-angle end, $X_1$ is an amount of movement of the first lens group from the wide-angle end to the telephoto end (the movement of the first lens group toward the object side is taken as positive), and $X_3$ is an amount of movement of the third lens group from the wide-angle end to the telephoto end (the movement of the third lens group toward the object side is taken as positive).

14. A zoom lens comprising, in order from its object side, a first lens group of positive refracting power, a second lens group of negative refracting power, a third lens group of positive refracting power and a fourth lens group of positive refracting power, characterized in that upon zooming from the wide-angle end to the telephoto end of the zoom lens, said first lens group, said second lens group, said third lens group and said fourth lens group each move such that an air spacing between said first lens group and said second lens group grows wide, an air spacing between said second lens group and said third lens group becomes narrow, and and air spacing between said third lens group and said fourth lens group grows wide, and said zoom lens satisfies the following conditions (11) and (21):

$$3 < D_{1p}/D_{1n} < 5 \quad (11)$$

$$9 < f_t/f_w < 20 \quad (21)$$

where $D_{1p}$ is a thickness on an optical axis of a positive lens in the first lens group, $D_{1n}$ is a thickness on the optical axis of a negative lens in the first lens group, $f_w$ is a focal length of the zoom lens system at the wide-angle end, and $f_t$ is a focal length of the zoom lens system at the telephoto end.

15. The zoom lens according to claim 14, characterized in that said first lens group comprises, in order from its object side, a negative lens and a positive lens.

16. The zoom lens according to claim 14, characterized in that the positive lens in said third lens group has an aspheric surface, and satisfies the following condition (13):

$$75 < Vd_3 < 100 \quad (13)$$

where $Vd_3$ is an Abbe number of the positive lens in the third lens group.

17. The zoom lens according to claim 14, characterized by satisfying the following condition (14):

$$-20 < Dt_w < -10 \quad (14)$$

where $Dt_w$ is distortion (%) of the maximum image height at the wide-angle end.

18. The zoom lens according to claim 14, characterized in that there is an aperture stop interposed between said second lens group and said third lens group, and upon zooming, said aperture stop moves together with said third lens group.

19. The zoom lens according to claim 14, characterized in that the negative lens in said first lens group satisfies the following conditions (15) and (16):

$$17 < Vd_1 < 30 \quad (15)$$

$$1.9 < nd_1 < 2.3 \quad (16)$$

where $Vd_1$ is an Abbe number of the negative lens in the first lens group, and $nd_1$ is a d-line refractive index of the negative lens in the first lens group.

20. The zoom lens according to claim 19, characterized in that said first lens group comprises only a cemented lens.

21. The zoom lens according to claim 14, characterized in that the negative lens in said third lens group satisfies the following condition (17):

$$-8 < (R_{3nb}+R_{3nf})/(R_{3nb}-R_{3nf}) < -4 \quad (17)$$

where $R_{3nf}$ is a radius of curvature near an optical axis of an object-side surface of the negative lens in the third lens group, and $R_{3nb}$ is a radius of curvature near the optical axis of an image-side surface of the negative lens in the third lens group.

* * * * *